United States Patent
Okada et al.

(10) Patent No.: US 9,846,817 B2
(45) Date of Patent: Dec. 19, 2017

(54) BED AREA EXTRACTION METHOD, BED AREA EXTRACTION APPARATUS, AND RECORDING MEDIUM

(71) Applicant: FUJITSU LIMITED, Kawasaki-shi, Kanagawa (JP)

(72) Inventors: Yasutaka Okada, Kawasaki (JP); Kimitaka Murashita, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 14/875,240

(22) Filed: Oct. 5, 2015

(65) Prior Publication Data

US 2016/0171337 A1 Jun. 16, 2016

(30) Foreign Application Priority Data

Dec. 11, 2014 (JP) ................. 2014-250795

(51) Int. Cl.
*G06K 9/46* (2006.01)
*G06T 7/12* (2017.01)

(52) U.S. Cl.
CPC ......... *G06K 9/4604* (2013.01); *G06K 9/4661* (2013.01); *G06T 7/12* (2017.01)

(58) Field of Classification Search
CPC .............. G01N 21/8806; G01N 21/93; G01N 21/95692; G01N 21/8851; G06K 9/34; G06K 9/4604; G06K 9/4638; G06K 9/38; G06K 9/4652; G06K 9/46; G06K 9/342; G06T 7/10; G06T 7/90; G06T 7/11; G06T 7/40; G06T 2207/20112
USPC ....... 382/141, 164, 165, 168, 171, 172, 173, 382/190, 192, 193, 195, 201, 203, 267, 382/316
See application file for complete search history.

(56) References Cited

U.S. PATENT DOCUMENTS

| | | | |
|---|---|---|---|
| 6,993,184 B2 * | 1/2006 | Matsugu | G06K 9/20 382/173 |
| 7,310,431 B2 * | 12/2007 | Gokturk | G01B 11/2509 356/4.01 |
| 2006/0074653 A1 | 4/2006 | Mitari et al. | |
| 2006/0245636 A1 * | 11/2006 | Kitamura | G06K 9/00 382/149 |
| 2010/0303334 A1 * | 12/2010 | Kitamura | G06K 9/00 382/141 |

(Continued)

FOREIGN PATENT DOCUMENTS

| JP | 2005-327244 | 11/2005 |
|---|---|---|
| JP | 2011-103037 | 5/2011 |

OTHER PUBLICATIONS

Banerjee, Tanvi, et al. "Monitoring patients in hospital beds using unobtrusive depth sensors." Engineering in Medicine and Biology Society (EMBC), 2014 36th Annual International Conference of the IEEE. IEEE, 2014.*

(Continued)

*Primary Examiner* — Andrew Moyer
*Assistant Examiner* — Narek Zohrabyan
(74) *Attorney, Agent, or Firm* — Fujitsu Patent Center

(57) ABSTRACT

A method of extracting a bed area of a bed performed by a computer, includes detecting linear edges which remain stationary among plural images; and selecting a bed area candidate based on lengths of the linear edges and angles between the linear edges which cross to each other in a U shape formed as combinations of the detected linear edges.

9 Claims, 33 Drawing Sheets

(56) References Cited

U.S. PATENT DOCUMENTS

2014/0139616 A1* 5/2014 Pinter .................. A61B 5/0008
            348/14.08

OTHER PUBLICATIONS

Li, Yun, et al. "Detection of patient's bed statuses in 3D using a Microsoft Kinect." Engineering in Medicine and Biology Society (EMBC), 2014 36th Annual International Conference of the IEEE. IEEE, 2014.*

Kittipanya-Ngam, Panachit, Ong Soh Guat, and Eng How Lung. "Bed detection for monitoring system in hospital wards." Engineering in Medicine and Biology Society (EMBC), 2012 Annual International Conference of the IEEE. IEEE, 2012.*

Panachit Kittipanya-Ngam et al., "Bed Detection for Monitoring System in Hospital Wards", 34th Annual International Conference of the IEEE EMBS San Diego, California USA, Aug. 28-Sep. 1, 2012, pp. 5887-5890 (4 pages).

* cited by examiner

FIG.6

| | FIRST HIERARCHY | SECOND HIERARCHY | THIRD HIERARCHY | FOURTH HIERARCHY |
|---|---|---|---|---|
| SHAPE | $\theta_1 \leq$ ANGLE OF EDGE $< \theta_2$ | $\theta_3 \leq$ ANGLE BETWEEN TWO SIDES $< \theta_4$ | $\theta_5 \leq$ ANGLE BETWEEN BOTH-END TWO SIDES $< \theta_6$ | $S_1 \leq$ AREA OF RECTANGULAR SHAPE DEFINED BY FOUR-SIDE CANDIDATE $< S_2$ |
| | | | $L_2 \leq$ WIDTH BETWEEN BOTH-END TWO SIDES | $R_1 \leq$ ASPECT RATIO OF RECTANGULAR SHAPE DEFINED BY FOUR-SIDE CANDIDATE $< R_2$ |
| OTHER THAN SHAPE | EDGE IS IN STATIC AREA | BOTH TWO SIDES FORM HORIZONTAL SURFACE | LUMINANCE DISTRIBUTION CHANGES FROM HIGH LUMINANCE TO LOW LUMINANCE | POSITION OF HEAD IS INCLUDED IN PREDETERMINED AREA |
| | $L_1 \leq$ LENGTH OF EDGE | | | DIRECTION OF HEAD CORRESPOND TO PREDETERMINED DIRECTION |

| EDGE Nos. | FIRST HIERARCHY | SECOND HIERARCHY | THIRD HIERARCHY | FOURTH HIERARCHY |
|---|---|---|---|---|
| | $I_1, I_2, I_3, I_4, I_5$ ... | $\{I_1, I_2\}, \{I_2, I_3\}, \{I_2, I_4\}$ ... | $\{I_1, I_2, I_3\}, \{I_2, I_3, I_4\}$ ... | $\{I_1, I_2, I_3, I_4\}$ |

700

FIG.24A
| CORRECT FACE DIRECTION OF WATCHING TARGET PERSON | FACE DIRECTION OF PERSON OTHER THAN WATCHING TARGET PERSON |
|---|---|
|  | (OTHER THAN LEFT) |
FIG.24B
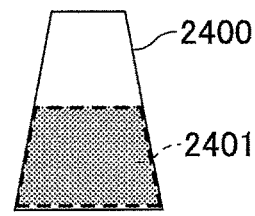
FIG.24C
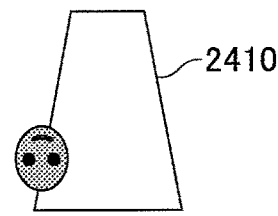
FIG.24D
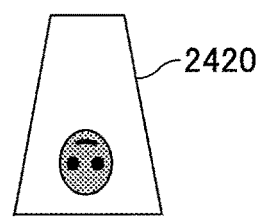
FIG.24E
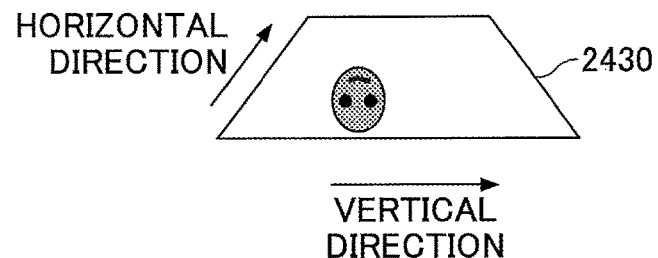

FIG.30

| HOSPITAL WARD | ROOM NUMBER | BED ID | ASPECT RATIO |
|---|---|---|---|
| HOSPITAL WARD "α" | ROOM 101 | BED 001 | H1:W1 |
| | | BED 002 | |
| | | BED 003 | |
| | | BED 004 | |
| | | BED 005 | |
| | | BED 006 | |
| | ROOM 102 | BED 011 | H2:W2 |
| | | BED 012 | |
| | | BED 013 | |
| | | BED 014 | |

HOSPITAL "A" — 3000

BED AREA EXTRACTION METHOD, BED AREA EXTRACTION APPARATUS, AND RECORDING MEDIUM

CROSS-REFERENCE TO RELATED APPLICATION

This application is based upon and claims the benefit of priority of the prior Japanese Patent Application No. 2014-250795 filed Dec. 11, 2014, the entire contents of which are incorporated herein by reference.

FIELD

The embodiments discussed herein are related to a bed area extraction method, a bed area extraction apparatus, and a recording medium.

BACKGROUND

Conventionally, there has been known a system which monitors body movement of a patient who is lying on a bed or a care-receiver (hereinafter collectively called a "watching target person") with an imaging apparatus in a hospital, a care facility, etc. Further, there has been known an apparatus which extracts the bed area based on the captured image in monitoring the watching target person using such a system.

However, in the hospital or the care facility, a bed installation position is not always fixed. That is, the bed may be moved. Due to this, it is not possible to uniquely determine the positional relationship between the bed and the imaging apparatus. Accordingly, it is desired to extract the bed area based on the captured image regardless of the positional relationship between the bed and the imaging apparatus.

In order to realize the extraction, for example, there are (a) a known method of extracting the bed area by using pattern matching based on a bed shape, and (b) another known method of extracting the bed area based by classifying the line segments of the image area into an upper end, a lower end, a left side, and a right side and averaging the respective line segments.

References are made to Japanese Laid-open Patent Publication Nos. 2011-103037 and 2005-327244.

Reference is made to Panachit Kittipanya-Ngam, Ong Soh Guat, Eng How Lung, "Bed Detection For Monitoring System In Hospital Wards", 34th Annual International Conference of the IEEE EMBS, San Diego, Calif. USA, 28 Aug.-1 Sep. 2012, p. 5887-5890.

SUMMARY

According to an aspect of the present application, a method of extracting a bed area of a bed performed by a computer, includes detecting linear edges which remain stationary among plural images; and selecting a bed area candidate based on lengths of the linear edges and angles between the linear edges which cross each other in a U shape formed as combinations of the detected linear edges.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 6 illustrates an example of filtering condition information;

FIG. 7 illustrates an example of bed area candidate information;

FIG. 24A illustrates examples of face directions;

FIG. 24B illustrates an area where the face of a watching target person is to be located;

FIGS. 24C and 24D illustrate example positions of the face of the watching target person;

FIG. 24E illustrates an example relationship between a face direction and a direction of the four-side candidate;

FIG. 30 illustrates an example of bed shape information;

DESCRIPTION OF EMBODIMENT

Figure 1:
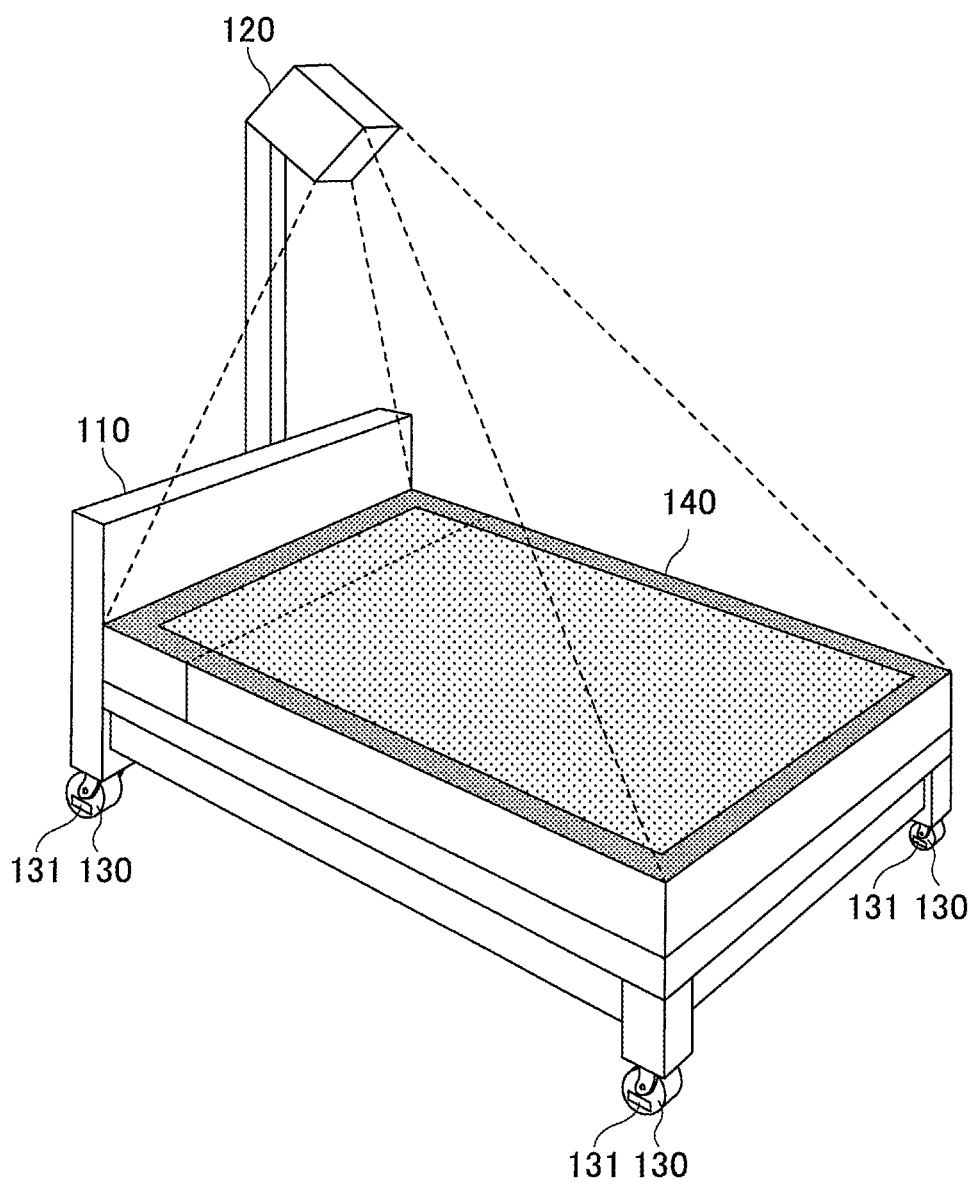
FIG. 1 illustrates an example layout of an imaging apparatus.

When a bed area is extracted by using a conventional method of extracting the bed area by using pattern matching based on a bed shape, the line segments are fractionated and a large number of line segments which are not related to the bed area extracted, so that the calculation amount becomes enormous. On the other hand when another conventional method is used by classifying the line segments of the image area into an upper end, a lower end, a left side, and a right side and averaging the respective line segments, it is not possible to accurately extract the bed area because of using the averaged values of the line segments.

In the following, embodiments of the present invention area described with reference to the accompanying drawings. Herein, note that the same reference numerals are used to describe the same or substantially the same functions or elements in the description and the drawings, and the repeated descriptions thereof may be omitted.

First Embodiment

First, a layout of an imaging apparatus, which is used for extracting a bed area, and the bed area which is to be extracted are described.

In FIG. 1, a bed 110 refers to a sleeping platform on which a watching target person lies in a hospital, a care facility, etc. Here, the legs of the bed 110 are equipped with respective casters 130. Due to having the casters 130, the installed position of the bed 110 can be easily changed. Further, the casters 130 are equipped with respective bed state acquisition sensors 131 which detect the locked state of the casters 130. The output from the bed state acquisition sensor 131 is used to determine whether the bed is in a movable state or a fixed state.

An imaging apparatus 120 is an apparatus to capture an image of the watching target person who is lying on the bed 110, and is mounted (installed) above the bed 110. A bed area 140 refers to an area which is extracted based on the image captured by the imaging apparatus 120.

Figure 2:
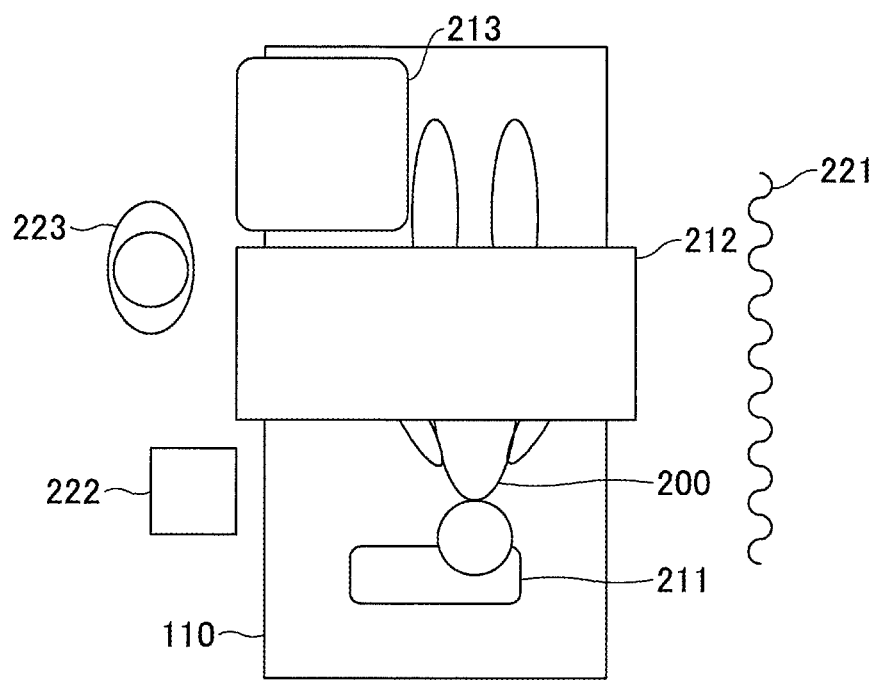
FIG. 2 illustrates an example layout of a bed, etc., included in an imaging area of the imaging apparatus.

Next, an example layout of the bed 110, etc., which is included in the image area of the imaging apparatus 120 is described. FIG. 2 illustrates an example layout of the bed 110, etc., included in the image area of the imaging apparatus 120. As illustrates in FIG. 2, in the image area of the imaging apparatus 120, there are various objects other than the bed 110 as well.

For example, on the bed 110, besides a watching target person 200, there are, for example, a pillow 211, an overhead table 212, and a futon (or blanket) 213, which are used by the watching target person 200. Further, near the bed 110, there are, for example, a curtain 221 and a chair 222. Further, near the bed 110, there may be a caregiver 223 such as a nurse, a care worker, etc.

As described, under a state where there exist various objects other than the bed 110, a bed area extraction system described below extracts the bed area 140 based on the captured image.

Figure 3:
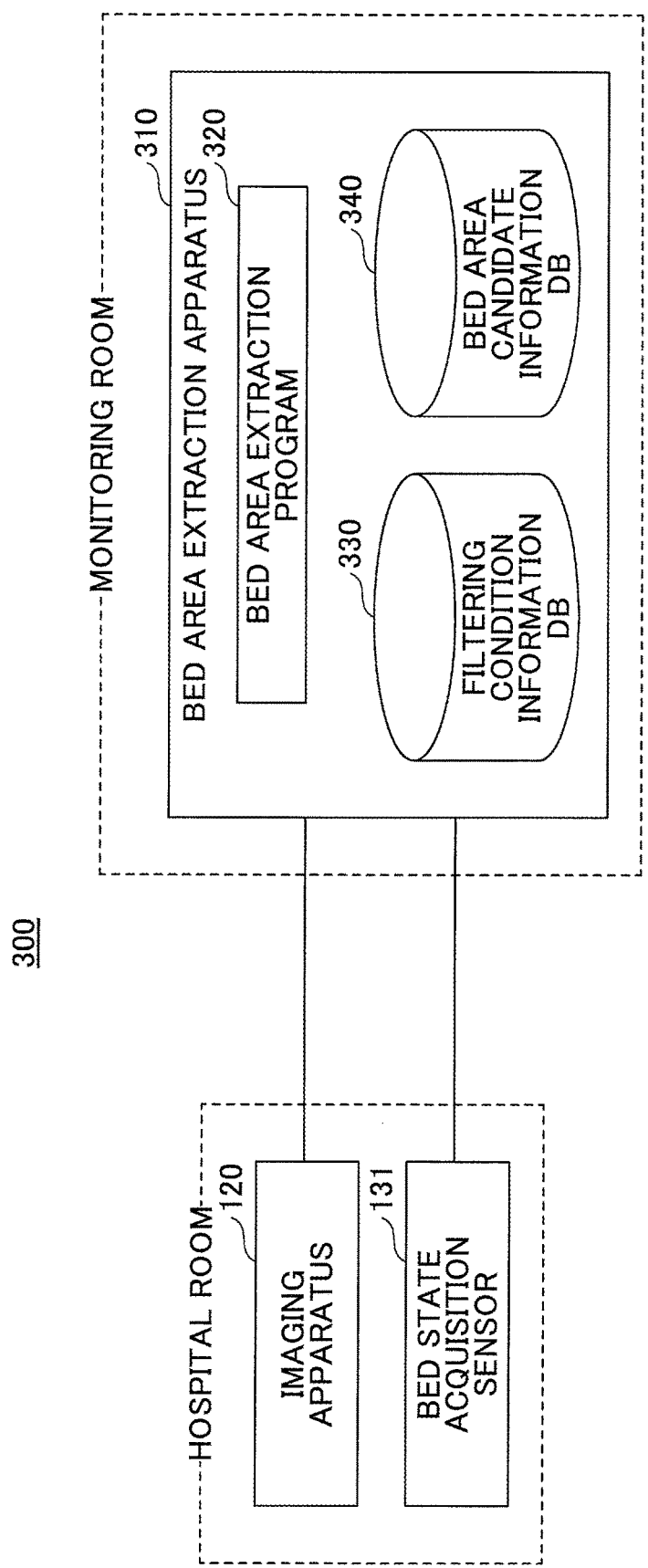
FIG. 3 illustrates an example system configuration of a bed area extraction system.

FIG. 3 illustrates an example system configuration of a bed area extraction system 300. As illustrated in FIG. 3, the bed area extraction system 300 include the imaging apparatus 120, the bed state acquisition sensors 131, and a bed area extraction apparatus 310.

The imaging apparatus 120 and the bed state acquisition sensors 131 are described above with reference to FIG. 1, and are arranged in a location such as a patient's bedroom where the bed 100 is installed on which the watching target person 200 lies. On the other hand, the bed area extraction apparatus 310 is installed, typically, in a location where the caregiver 223 resides such as a monitoring room, etc.

Further, the imaging apparatus 120, the bed state acquisition sensors 131, and the bed area extraction apparatus 310 are connected to each other via a network.

The bed area extraction apparatus 310 includes a bed area extraction program 320 installed therein. Further, the bed area extraction apparatus 310 includes a filtering condition information database (hereinafter simplified as "DB") 330 and a bed area candidate information DB 340, which are stored therein.

Figure 4:
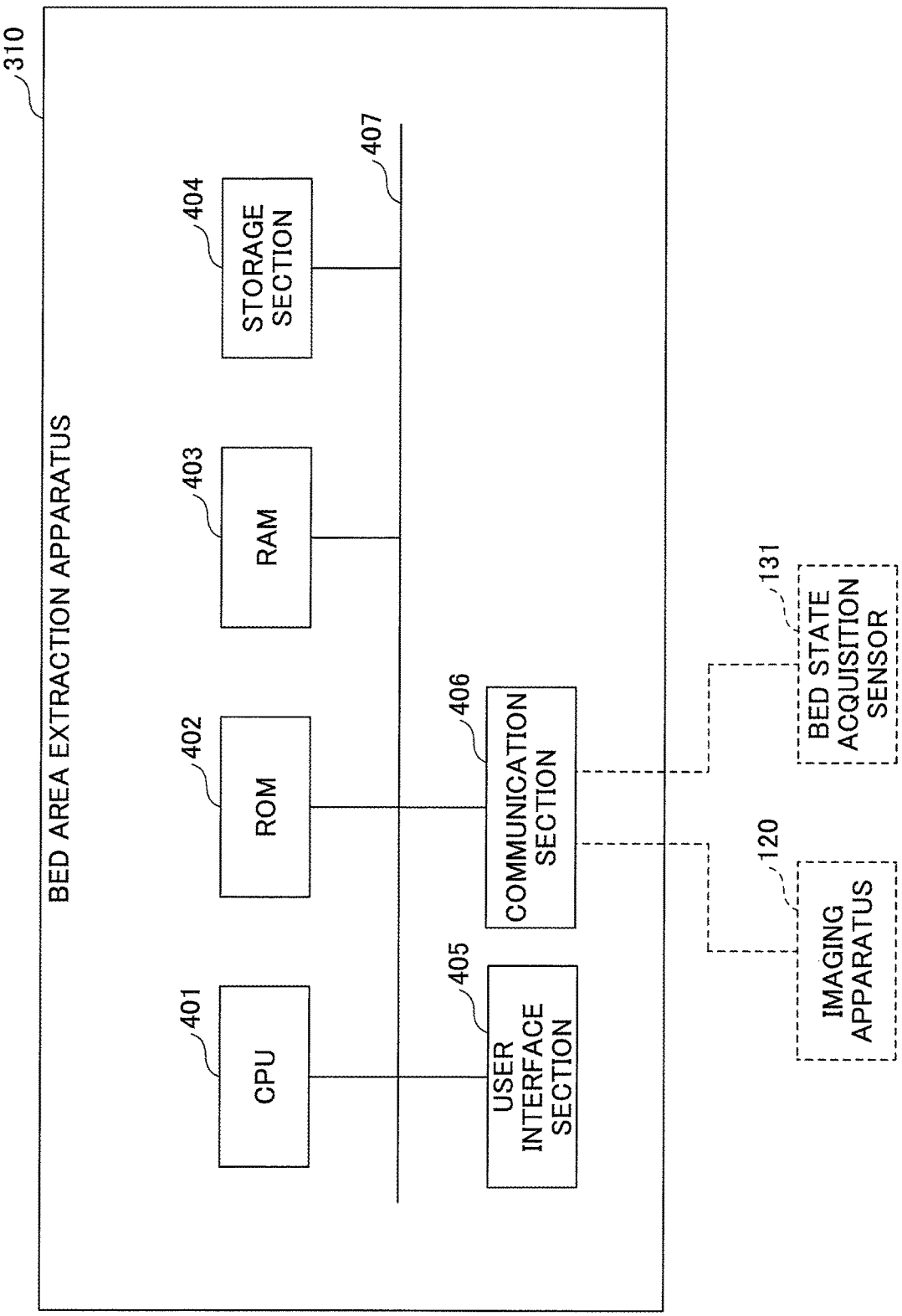
FIG. 4 illustrates an example hardware configuration of a bed area extraction apparatus.

Next, an example hardware configuration of the bed area extraction apparatus 310 is descried. FIG. 4 illustrates an example hardware configuration of the bed area extraction apparatus 310. As illustrated in FIG. 4, the bed area extraction apparatus 310 includes a Central Processing Unit (CPU) (processor) 401, a Read-Only Memory (ROM) 402, a Random Access Memory (RAM) 403, and a storage section (memory device) 404. The bed area extraction apparatus 310 further includes a user interface section 405 and a communication section 406. Further, those elements of the bed area extraction apparatus 310 are connected to each other via a bus 407.

The CPU 401 is a computer which executes various programs (e.g., the bed area extraction program 320, etc.) stored in the storage section 404. The storage section 404 may be implemented by a computer-readable recording medium storing the bed area extraction program 320 therein.

The ROM 402 is a non-volatile memory, and stores various programs, data, etc., which are necessary for the CPU 401 to execute the various programs stored in the storage section 404. Specifically, the ROM 402 stores boot programs such as Basic Input/Output System (BIOS), Extensible Firmware Interface (EFI), etc.

The RAM 403 is a main memory (made of) such as Dynamic Random Access Memory (DRAM), Static Random Access Memory (SRAM), etc. The RAM 403 functions as a working area which is provided when the various programs stored in the storage section 404 are executed by the CPU 401.

The storage section 404 stores various programs, which are installed in the bed area extraction apparatus 310, and the DBs in which records, for example, the data to be used when the various programs are executed and the data which are generated when the various programs are executed. The DBs in the storage section 404 include, for example, the filtering condition information DB 330 and the bed area candidate information DB 340.

The user interface section 405 receives various operations relative to the bed area extraction apparatus 310. The communication section 406 is used so that the bed area extraction apparatus 310 can communicate with the imaging apparatus 120 and the bed state acquisition sensors 131.

Figure 5:
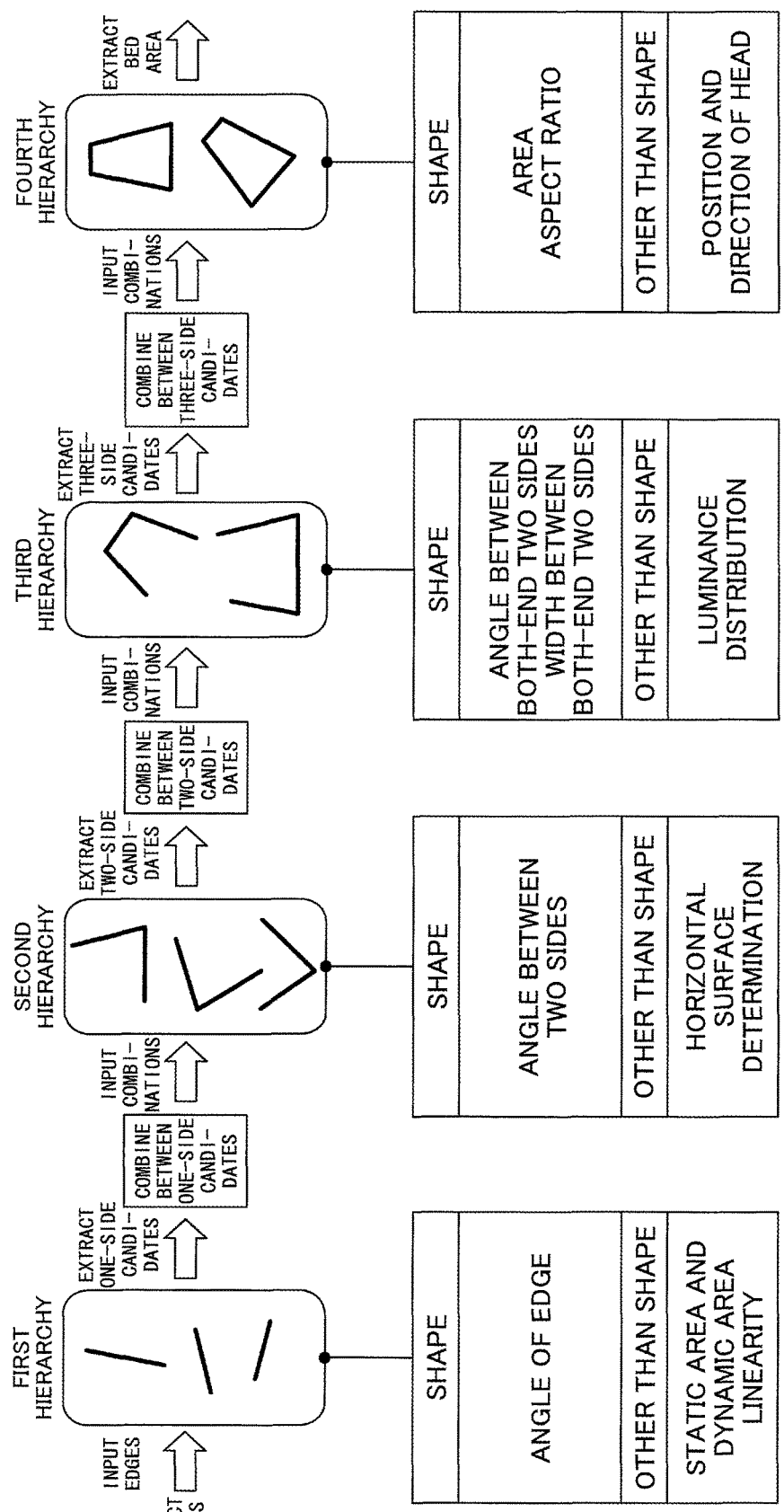
FIG. 5 is a first drawing illustrating a fundamental principle of a bed area extraction process.

Next, a fundamental principle of a bed area extraction process performed by the bed area extraction apparatus 310 is described. FIG. 5 illustrates a fundamental principle of the bed area extraction process. As illustrated in FIG. 5, the bed area extraction apparatus 310 performs the process of extracting the bed area based on the edges detected in the captured image by dividing the process into four hierarchies.

In a first hierarchy, based on the edges detected in the captured image, sides (line segments), which may form (define) the bed area, are extracted. Hereinafter, the side (line segment) which may form (define) the bed area is called a "one-side candidate". The edges which are extracted from the captured image include various line segments. Therefore, in this first hierarchy, the "one-side candidate" is extracted by removing the side (line segment) by which the bed area cannot be formed.

Specifically, (in this first hierarchy) the edges are removed (excluded) such as an edge whose angle is not within a predetermined angle range, an edge which is located in a dynamic area, and an edge having insufficient linearity. Here, the term "dynamic area" refers to the area where there exists an object which is one of the various objects imaged in the captured images and has been moved during the time period corresponding to a predetermined number of frames. It is thought that the bed area extraction process is performed when the bed 110 is in the fixed state. Therefore, it is thought that the edge, which is in the dynamic area, does not form the bed area. In this regard, a "static area" refers to an area which is other than the "dynamic area" of the captured image and an area of an object which has not been moved during the time period corresponding to the predetermined number of frames.

The one-side candidates extracted in the first hierarchy are combined under a predetermined condition. By the combining, an L shape formed of two one-side candidates is formed. In the following the L shape which is formed by combing two one-side candidates is called "two-side candidate". The generated two-side candidate is input in a second hierarchy.

In the second hierarchy, from the input two-side candidates, the two-side candidate, which may form the bed area 140, is extracted. By combining the one-side candidates, various two-side candidates are generated. Therefore, in this second hierarchy, the two-side candidate which may not form the bed area 140 is removed (excluded).

Specifically, among the input two-side candidates, for example, a two-side candidate whose angle between two sides thereof (angle of cross edge) is not included in a predetermined angle range, and a two-side candidate which includes a side which does not form a horizontal surface are removed. Here the "horizontal surface" refers to a surface which is parallel to a floor surface on which the bed 110 is installed (placed). The bed area 140 is formed by the sides which are parallel to the floor surface. Therefore, it is thought that the two-side candidate including, for example, a side which forms a surface orthogonal (vertical) to the floor surface is the two-side candidate that cannot form the bed area 140.

The two-side candidates extracted in the second hierarchy are combined under a predetermined condition to form a U shape. In the following, the U shape which is formed by combining two two-side candidates is called "three-side candidate". The generated three-side candidate is input in a third hierarchy.

In the third hierarchy, based on the input three-side candidates, the three-side candidate, which may form the bed area 140, is extracted. By combining the two-side candidates, various three-side candidates are generated.

Therefore, in this third hierarchy, the three-side candidate which may not form the bed area 140 is removed (excluded).

Specifically, among the input three-side candidates, for example, a three-side candidate whose angle between two end sides (two sides of the three sides forming the U shape excluding the center side thereof located between other two sides) (an angle of the edge formed by the two end sides) is not included in a predetermined angle range, and a three-side candidate whose width between the two end sides thereof is less than a predetermined length are removed. Further, when the luminance distribution of the captured image near the two end sides of a three-side candidate is less than a predetermined luminance distribution, the three-side candidate is also excluded.

The three-side candidates extracted in the third hierarchy are combined under a predetermined condition to form a rectangular shape. In the following, the rectangular shape which is formed by combining two three-side candidates is called "four-side candidate". The generated four-side candidate is input in a fourth hierarchy.

In the fourth hierarchy, based on the input four-side candidates, the four-side candidate, which may form the bed area 140, is extracted. By combining the three-side candidates, various four-side candidates are generated. Therefore, in this fourth hierarchy, the four-side candidate which may not form the bed area 140 is removed (excluded).

Specifically, among the input four-side candidates, for example, a four-side candidate whose area is not included in a predetermined area range, and a four-side candidate which may not form the bed area 140 based on a relationship between the position of the face of the watching target person 200 and the position of the four-side candidate, a horizontal and vertical relationship based on the face direction, and a horizontal and vertical direction of the four-side candidate, which area based on the captured image, are excluded. By doing this, the four-side candidate which has been determined as the bed area 140 is output from the fourth hierarchy.

As described above, by dividing the process of extracting the bed area 140 based on the edges detected from the captured image into four hierarchies, the following effects can be obtained.

For example, it is assumed that 100 edges are detected from the captured image. In this case, the number of combinations of four sides using 100 edges is calculated as $_{100}C_4=(100\times99\times98\times97)/(4\times3\times2\times1)=3,921,255$ Due to this, for example, when all the combinations of four sides are conventionally calculated based on the detected edges, and pattern matching is performed on each of the combinations, the calculation amount becomes enormous.

On the other hand, by dividing into four hierarchies and excluding the candidates which may not form the bed area 140 in each of the hierarchies, it becomes possible to remarkably reduce the number of combinations. Further, in the fourth hierarchy, it is possible to extract the four-side candidate which can form the bed area 140. Therefore, it is not necessary to perform the conventional pattern matching. As a result, by using the bed area extraction apparatus 310 according to an embodiment, it becomes possible to remarkably reduce the calculation amount to extract the bed area 140.

Next, the DBs (filtering condition information DB 330 and the bed area candidate information DB 340) are described which are stored in the bed area extraction apparatus 310.

First, the filtering condition information of the filtering condition information DB 330 is described. FIG. 6 illustrates an example of the filtering condition information 600. The filtering condition information 600 is stored in the filtering condition information DB 330 and provides (defines) conditions which are used to select ("filter") candidates in each hierarchy.

The information items of the filtering condition information 600 include "first hierarchy", "second hierarchy", "third hierarchy", and "fourth hierarchy".

In the "first hierarchy", the conditions are provided to extract the "one-side candidates" from the extracted edges (in the captured image). Specifically, the conditions of the "first hierarchy" are the angle of the extracted edge is in a predetermined angle range (greater than or equal to "$\theta_1$" and less than "$\theta_2$"); the edge is located in the "static area"; and the length of the edge is greater than a predetermined length (greater than or equal to "$L_1$").

In the "second hierarchy", the conditions are provided to extract the "two-side candidates" which may form the bed area 140 from the "two-side candidates" which are input therein. Specifically, the conditions of the "second hierarchy" are the angle of the two sides of the "two-side candidate" (the angle between the edges which cross to each other) is in a predetermined angle range (greater than or equal to "$\theta_3$" and less than "$\theta_4$"); and each of the two sides of the "two-side candidate" is a horizontal component which forms the "horizontal surface".

In the "third hierarchy", the conditions are provided to extract the "three-side candidates" which may form the bed area 140 from the "three-side candidates" which are input therein. Specifically, the conditions of the "third hierarchy" are the angle of the two sides which include respective ends of the "three-side candidate" (angle between the two edges which cross to each other) is in a predetermined angle range (greater than or equal to "$\theta_5$" and less than "$\theta_6$"); and the width between the two sides which include respective ends of the "three-side candidate" is greater than or equal to a predetermined length ("$L_2$"). Further, a condition is provided that the luminance distribution near the two sides which include respective ends of the "three-side candidate" in the captured image is changed from high luminance to low luminance.

In the "fourth hierarchy", the conditions are provided to extract the "four-side candidates" which may form the bed area 140 from the "four-side candidates" which are input therein. Specifically, the conditions of the "fourth hierarchy" are that the area of the rectangular area ("candidate area") defined by the "four-side candidate" is in a predetermined area range (greater than or equal to "$S_1$" and less than "$S_2$"); and the aspect ratio of the rectangular area defined by the "four-side candidate" is in a predetermined range (greater than or equal to "$R_1$" and less than "$R_2$"). Further, conditions are provided that the position of the face of the watching target person 200, which is extracted from the captured image, is included in a predetermined area in the rectangular area defined by the "four-side candidate"; and the horizontal and vertical relationship based on the face direction corresponds to the horizontal and vertical relationship based on the aspect ratio of the "four-side candidate".

Next, the bed area candidate information of the bed area candidate information DB 340 is described. FIG. 7 illustrates an example of the bed area candidate information 700. The bed area candidate information 700 is stored in the bed area candidate information DB 340, and records the candidate selected in each of the hierarchies.

The information items of the bed area candidate information 700 include "first hierarchy", "second hierarchy", "third hierarchy", and "fourth hierarchy".

In the "first hierarchy", the identification numbers of the "one-side candidates", which are extracted in the "first hierarchy", are recorded (stored). The example of FIG. 7 indicates that the edges whose identification Nos. are "$I_1$", "$I_2$", "$I_3$", "$I_4$", "$I_5$", . . . are extracted as the "one-side candidates".

In the "second hierarchy", the "two-side candidates", which are extracted in the "second hierarchy", are recorded as the combinations of the identification numbers of the "one-side candidates". The example of FIG. 7 indicates that the "two-side candidate" based on the combination between the identification No.="$I_1$" and the identification No.="$I_2$" is extracted. Further, the example of FIG. 7 indicates that the "two-side candidate" based on the combination between the identification No.="$I_2$" and the identification No.="$I_3$", the "two-side candidate" based on the combination between the identification No.="$I_2$" and the identification No.="$I_4$", etc., are extracted.

In the "third hierarchy", the "three-side candidates", which are extracted in the "third hierarchy", are recorded as the combinations of the identification numbers of the "one-side candidates". The example of FIG. 7 indicates that that the "three-side candidate" based on the combination among the identification No.="$I_1$", the identification No.="$I_2$", and identification No.="$I_3$", the "three-side candidate" based on the combination among the identification No.="$I_2$", the identification No.="$I_3$", and identification No.="$I_4$", etc., are extracted.

In the "fourth hierarchy", the "four-side candidates", which are extracted in the "fourth hierarchy", are recorded as the combinations of the identification numbers of the "one-side candidates". The example of FIG. 7 indicates that that the "four-side candidate" based on the combination among the identification No.="$I_1$", the identification No.="$I_2$", identification No.="$I_3$", and the identification No.="$I_4$" is extracted.

Figure 8:
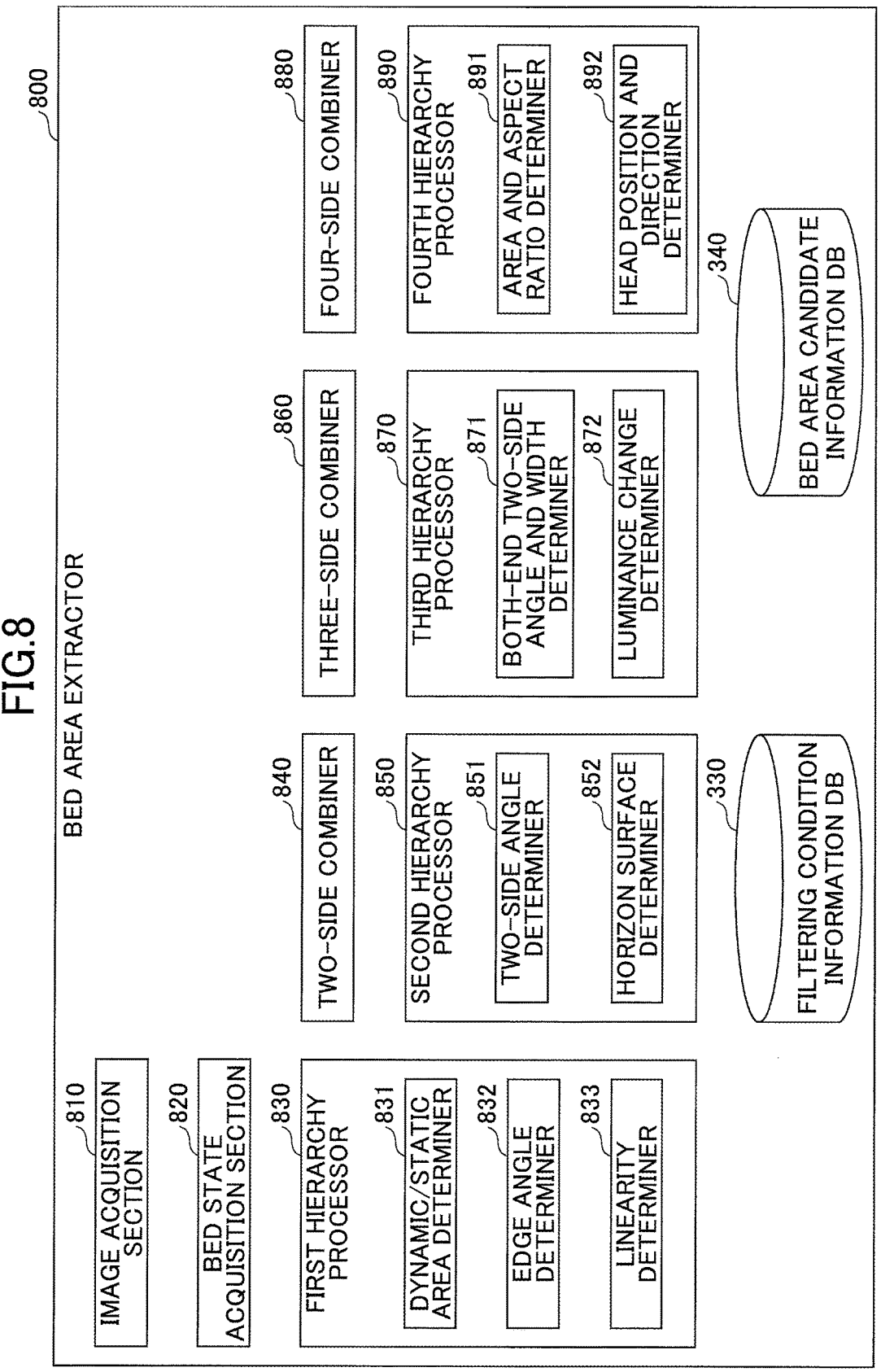
FIG. 8 is a first drawing illustrating an example functional configuration of a bed area extractor.

Next, a functional configuration of a bed area extractor 800 is described which is realized in the bed area extraction apparatus 310 by executing the bed area extraction program 320 by the CPU 401. FIG. 8 illustrates an example functional configuration of the bed area extractor 800.

As illustrated in FIG. 8, the bed area extractor 800 includes an image acquisition section 810, a bed state acquisition section 820, a first hierarchy processor 830, a two-side combiner 840, a second hierarchy processor 850, a three-side combiner 860, a third hierarchy processor 870, a four-side combiner 880, and a fourth hierarchy processor 890.

The image acquisition section 810 acquires a captured image, which is acquired by imaging the image area by the imaging apparatus 120, via the communication section 406. Further, the image acquisition section 810 performs an edge process on the captured image acquired therein and extracts the edges (linear edges). (That is, the image acquisition section 810 functions as an edge detector.)

The bed state acquisition section 820 acquires the output signals from the bed state acquisition sensors 131 and determines whether the casters 130 of the bed 110 are in the locked state to determine whether the bed 110 is in the fixed state. That it, when it is determined that the casters 130 are in the locked state, it is determined that the bed 110 is in the fixed state. On the other hand, when the locked state is released, it is determined that the bed 100 is in the movable state.

The first hierarchy processor 830 extracts the "one-side candidates" (and functions as a selector to select the edges). The first hierarchy processor 830 includes a dynamic/static area determiner 831, an edge angle determiner 832, and a linearity determiner 833. The dynamic/static area determiner 831 determines the dynamic area and the static area in the captured image. The edge angle determiner 832 determines whether the angle of the edge, which is determined to be located in the static area from among the edges that are input in the first hierarchy, is in the predetermined angle range (greater than or equal to "$\theta_1$" and less than "$\theta_2$"), and excludes the edge whose angle is out of the predetermined angle range. The linearity determiner 833 integrates the edges whose angles are determined to be within the predetermined angle range and which are similar to each other, and extracts the integrated edge which has the length greater than or equal to the predetermined length ("$L_1$") as the "one-side candidate".

The two-side combiner 840 combines the "one-side candidates", which are extracted by the first hierarchy processor 830, under predetermined conditions. Specifically, in a case where the position of an edge (end) of a first "one-side candidate" relative to the position of an edge of a second "one-side candidate" is within a predetermined distance range, the two-side combiner 840 combines the first "one-side candidate" with the second "one-side candidate".

The second hierarchy processor 850 extracts the "two-side candidates" which may form the bed area 140 from among the "two-side candidates" which are generated by the combining by the two-side combiner 840 (and functions as a selector to select the "two-side candidates"). The second hierarchy processor 850 includes a two-side angle determiner 851, and a horizon surface determiner 852.

The two-side angle determiner 851 excludes the "two-side candidate" whose angle between the two sides (angle between the two edges which cross each other) is out of the predetermined angle range (greater than or equal to "$\theta_3$" and less than "$\theta_4$") from among the "two-side candidates" which are generated by the combining by the two-side combiner 840. The horizon surface determiner 852 excludes the "two-side candidate" in which at least one of the two sides (edges) does not form the "horizontal surface" from among the "two-side candidates" which are not excluded by the two-side angle determiner 851. Accordingly, the second hierarchy processor 850 outputs the "two-side candidates" which are not excluded by the horizon surface determiner 852 to the three-side combiner 860.

The three-side combiner 860 combines the "two-side candidates", which are extracted by the second hierarchy processor 850, under predetermined conditions. Specifically, in a case where the position and the direction of a first "two-side candidate" relative to the position and the direction of a second "two-side candidate" is within a predetermined relationship, the three-side combiner 860 combines the first "two-side candidate" with the second "two-side candidate".

The third hierarchy processor 870 extracts the "three-side candidates" which may form the bed area 140 from among the "three-side candidates" which are generated by the combining by the three-side combiner 860 (and functions as a selector to select the "three-side candidates"). The third hierarchy processor 870 includes a both-end two-side angle and width determiner 871, and a luminance change determiner 872.

The both-end two-side angle and width determiner 871 excludes the "three-side candidate" whose angle between the both-end two sides (which ("both-end two sides") herein refer to the two sides (edges) included in the three sides of the "three-side candidate" generated by the combining by the three-side combiner 860, which do not include the one side which is located between the two sides, and the both ends of the "three-side candidate" are included in the respective "two sides") (the angle of the edges which cross each other) is out of the predetermined angle range (greater than or equal to "$\theta_5$" and less than "$\theta_6$") from among the "three-side candidates" which are generated by the combining by the three-side combiner 860. Further, the both-end two-side angle and width determiner 871 excludes the "three-side candidate" having the width between the both-end two sides less than the predetermined length (not greater than or equal to "$L_2$") from among the "three-side candidates" whose angle between the both-end two sides (the angle of the edges which cross each other) is within the predetermined angle range.

The luminance change determiner 872 excludes the "three-side candidate" whose luminance distribution near the both-end two sides thereof is not sufficient for the predetermined luminance distribution from among the "three-side candidates" which are not excluded by the both-end two-side angle and width determiner 871. Further, the third hierarchy processor 870 outputs the "three-side candidates" which are not excluded by the luminance change determiner 872 to the four-side combiner 880.

The four-side combiner 880 combines the "three-side candidates", which are extracted by the third hierarchy processor 870, under predetermined conditions. Specifically, in a case where, in a captured image, the position of a first "three-side candidate" is located under the position of a second "three-side candidate" and the width between the both-end two sides of the first "three-side candidate" is greater than the width between the both-end two sides of the second "three-side candidate", the four-side combiner 880 combines the first "three-side candidate" with the second "three-side candidate". Here, it is assumed that the four-side combiner 880 combines the first "three-side candidate" with the second "three-side candidate" in a case where the both-end two sides of the first "three-side candidate" are on the same lines of the respective both-end two sides of the second "three-side candidate".

The fourth hierarchy processor 890 extracts the "four-side candidates" which may form the bed area 140 from among the "four-side candidates" which are generated by the combining by the four-side combiner 880 (and functions as a selector to select the "four-side candidates"). The fourth hierarchy processor 890 includes an area and aspect ratio determiner 891, and a head position and direction determiner 892.

The area and aspect ratio determiner 891 excludes the "four-side candidate" having the area which is not within the predetermined area range (greater than or equal to "$S_1$" and less than "$S_2$") and the "four-side candidate" whose aspect ratio is not within the predetermined range (greater than or equal to "$R_1$" and less than "$R_2$") from among the "four-side candidates" which are generated by the combining by the four-side combiner 880.

The head position and direction determiner 892 excludes the "four-side candidate" in which the position of the face of the watching target person 200 extracted from the captured image is not within a predetermined area. Further, the head position and direction determiner 892 excludes the "four-side candidate" in which the horizontal and vertical relationship based on the face direction does not correspond to the horizontal and vertical relationship based on the aspect ratio from among the "four-side candidates" in which the position of the face of the watching target person 200 is within the predetermined area. Further, the head position and direction determiner 892 (the fourth hierarchy processor 890) determines and outputs the "four-side candidate", in which the horizontal and vertical relationship based on the face direction corresponds to the horizontal and vertical relationship based on the aspect ratio, as the bed area 140. The output destination of the "four-side candidate" as the bed area 140 may be the storage section 404 in the bed area extraction apparatus 310 or an external apparatus which is connected to the bed area extraction apparatus 310.

Figure 9:
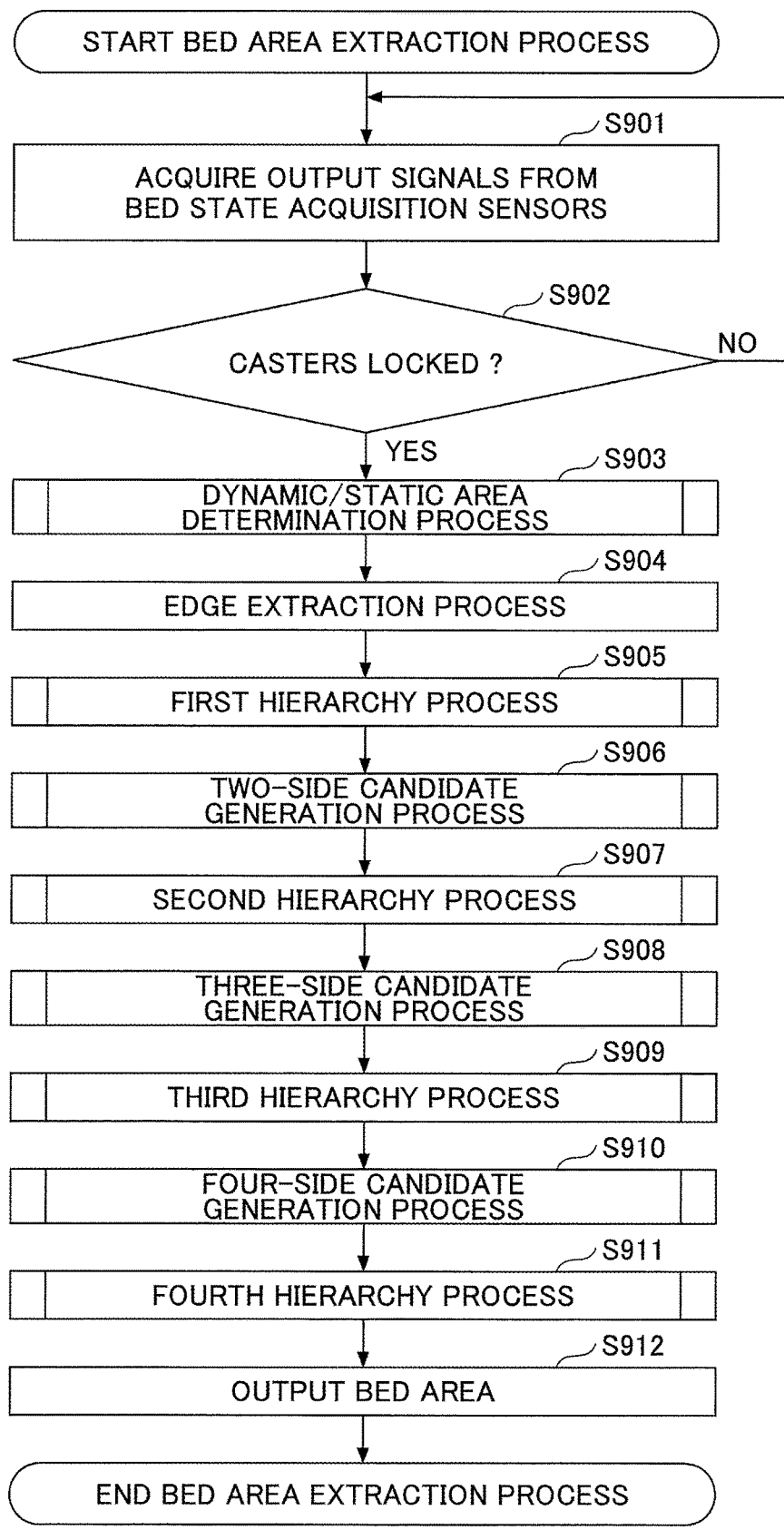
FIG. 9 is a first flowchart of an example of a bed area extraction process.

Next, the bed area extraction process performed by the bed area extractor 800 is described. FIG. 9 is a flowchart of an example of the bed area extraction process. When the bed area extraction process starts, in step S901, the bed state acquisition section 820 acquires the outputs signals from the bed state acquisition sensors 131.

In step S902, based on the acquired output signals, the bed state acquisition section 820 determines whether the casters 130 of the bed 110 are in the locked state. When it is determined that the casters 130 of the bed 110 are not in the locked state (NO in step S902) it is determined that the bed 110 is in the movable state and the process goes back to step S901. On the other hand, when it is determined that the casters 130 of the bed 110 are in the locked state (YES in step S902), the process goes to step S903.

In step S903, the image acquisition section 810 acquires a captured image, and the dynamic/static area determiner 831 performs a dynamic/static area determination process based on the captured image acquired therein. In step S904, the image acquisition section 810 performs the edge process on the captured image acquired therein, and extracts the edges.

In step S905, the first hierarchy processor 830 extracts the "one-side candidates" by performing a first hierarchy process. In step S906, the two-side combiner 840 generates the "two-side candidates" based on the extracted "one-side candidates" by performing a generation process of the "two-side candidate".

In step S907, the second hierarchy processor 850 performs a second hierarchy process to extract the "two-side candidates", which may form the bed area 140, based on the "two-side candidates" generated by the two-side combiner 840. In step S908, the three-side combiner 860 performs a generation process of the "three-side candidates" to generate the "three-side candidates" based on the extracted "two-side candidates".

In step S909, the third hierarchy processor 870 performs a third hierarchy process to extract the "three-side candidates", which may form the bed area 140, based on the "three-side candidates" generated by the three-side combiner 860. In step S910, the four-side combiner 880 performs a generation process of the "four-side candidates" to generate the "four-side candidates" based on the extracted "three-side candidates".

In step S911, the fourth hierarchy processor 890 performs a fourth hierarchy process to extract the "four-side candidate", which may form the bed area 140, based on the "four-side candidates" generated by the four-side combiner 880.

In step S912, the fourth hierarchy processor 890 performs a fourth hierarchy process to output the extracted "four-side candidate" as the bed area 140.

Next, details of the steps (steps S903 and S905 through S911) in the bed area extraction process are further described.

Figure 10:
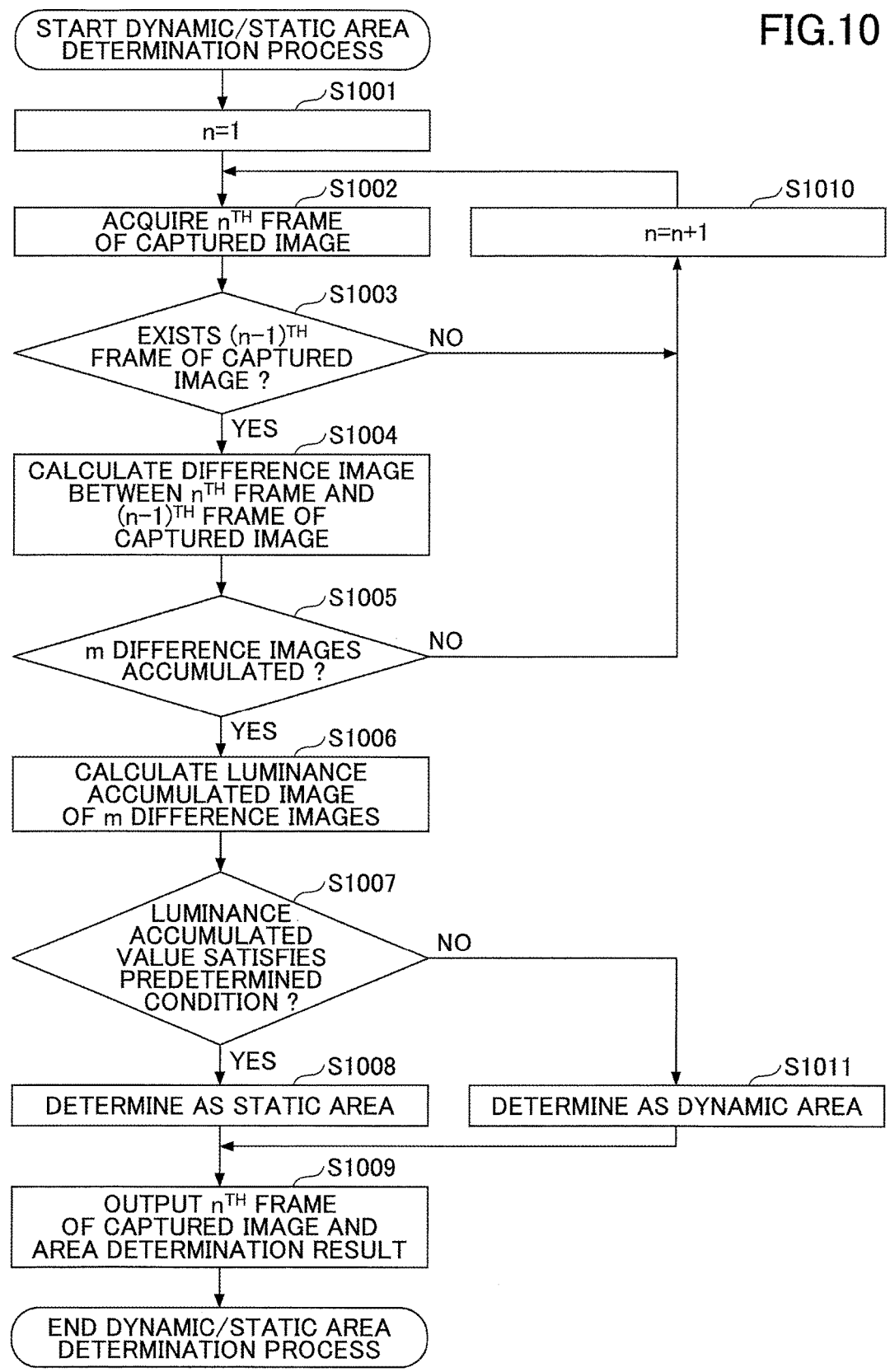
FIG. 10 is a flowchart of an example dynamic/static area determination process.

First, details of the dynamic/static area determination process (in step S903) are described. FIG. 10 is a flowchart of an example of the dynamic/static area determination process.

In step S1001, the dynamic/static area determiner 831 set "1" to a frame counter "n". In step S1002, the image acquisition section 810 acquires the nth frame of the captured image.

In step S1003, the image acquisition section 810 determines whether there exists the (n−1)th frame of the captured image. When it is determined that there exists no (n−1)th frame of the captured image (NO in step S1003), the process goes to step S1010. In step S1010, the value (n) of the frame counter is incremented and then, the process goes back to step S1002. On the other hand, when it is determined that there exists the (n−1)th frame of the captured image (YES in step S1003), the process goes to step S1004.

In step S1004, the dynamic/static area determiner 831 calculates the difference image between the nth frame of the captured image and the (n−1)th frame of the captured image. In step S1005, the dynamic/static area determiner 831 determines whether m difference images are accumulated (calculated).

When it is determined that m difference images are not accumulated (NO in step S1005), the process goes to step S1010, so that the value (n) of the frame counter is incremented and then, the process goes back to step S1002.

On the other hand, when it is determined that m difference images are accumulated (YES in step S1005), the process goes to step S1006. In step S1006, the dynamic/static area determiner 831 calculates a luminance accumulation image by accumulating the luminance of each of the pixels among the m difference images.

In step S1007, the dynamic/static area determiner 831 determines whether a luminance accumulation value of each of areas included in the luminance accumulation image satisfies a predetermined condition. Specifically, when it is determined that the luminance accumulation value is less than or equal to a predetermined threshold value, it is determined that the luminance accumulation value satisfies the predetermined condition (YES in step S1007), and the process goes to step S1008. The luminance value of a stationary object does not change between different frames. Thus, the difference value between frames is zero, so that the luminance accumulation value is zero. Therefore, when the luminance accumulation value is less than or equal to the predetermined threshold value, it is possible to determine that the area is the "static area".

On the other hand, when it is determined that the luminance accumulation value is greater than the predetermined threshold value, it is determined that the luminance accumulation value does not satisfy the predetermined condition (NO in step S1007), and the process goes to step S1011. The luminance value of a moving object varies depending on the frames. Thus, the difference value between frames is other than zero, so that the luminance accumulation value is other than zero. Therefore, when the luminance accumulation value is greater than the predetermined threshold value, it is possible to determine that the area is the "dynamic area".

In step S1008, the dynamic/static area determiner 831 determines the area which satisfies the predetermined condition as the "static area". Further, in step S1011, the dynamic/static area determiner 831 determines the area which does not satisfy the predetermined condition as the "dynamic area".

In step S1009, the dynamic/static area determiner 831 notifies the edge angle determiner 832 of the nth frame of the captured image and the determination results of the areas.

Figure 11:
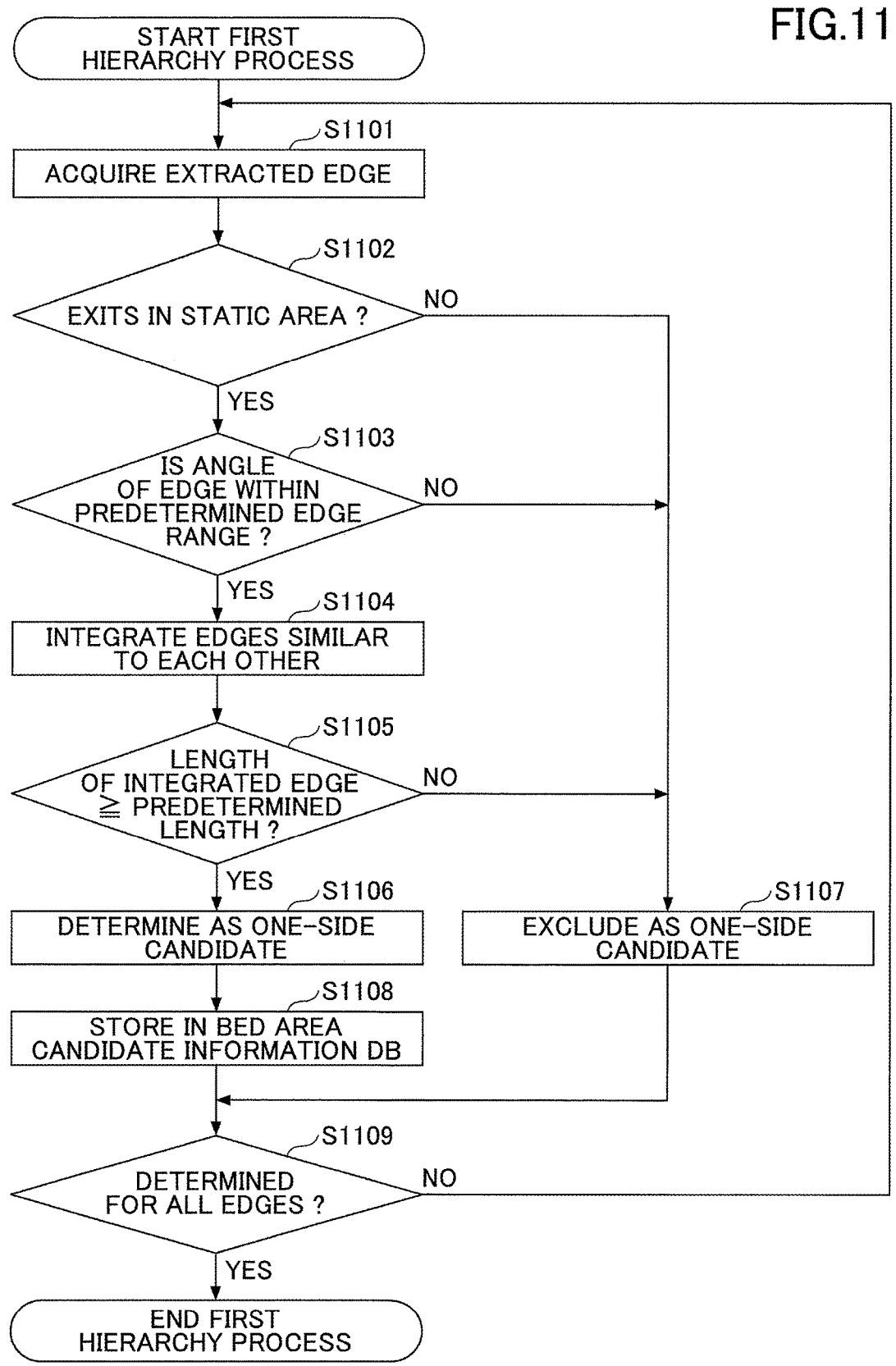
FIG. 11 is a flowchart of an example first hierarchy process.

Next, details of the first hierarchy process (in step S905) are described. FIG. 11 is a flowchart of an example of the first hierarchy process.

In step S1101, the edge angle determiner 832 acquires the edges one after another which are extracted by performing the edge process by the image acquisition section 810 on the nth frame of the captured image which is acquired by the image acquisition section 810.

In step S1102, the edge angle determiner 832 determines whether the position of the acquired edge is in the "static area" (or in the "dynamic area"). When it is determined that the edge is in the "dynamic area" (NO in step S1102), the process goes to step S1107. In step S1107, the edge angle determiner 832 excludes the edge from the "one-side candidate".

By excluding the edge in the "dynamic area" from the "one-side candidate" as described, even when, for example, a part of the caregiver 223 is detected as the edge or a part of the curtain 221 is detected as the edge, it becomes possible to exclude (remove) those edges from the "one-side candidate".

On the other hand, when it is determined that the edge is in the "static area" (YES in step S1102), the process goes to step S1103. In step S1103, the edge angle determiner 832 further determines whether the angle of the edge, which is determined to be in the static area, is within the predetermined angle range (greater than or equal to "$\theta_1$" and less than "$\theta_2$"). When it is determined that the angle of the edge is out of the predetermined angle range (NO in step S1103), the process goes to step S1107. In step S1107, the edge angle determiner 832 excludes the edge from the "one-side candidate".

On the other hand, when it is determined that the angle of the edge is within the predetermined angle range (YES in step S1103), the process goes to step S1104. In step S1104, the linearity determiner 833 integrates the edges similar to each other from among the edges whose angles are within the predetermined angle range. By doing this, even when, for example, the futon 213 is placed on the edge part of the bed 110 so that a part of the edge part of the bed 110 is shielded (masked) by the futon 213, it becomes possible to interpolate the edge in the shielded section. In this case, the futon 213, etc., has a concavo-convex shape, so that the edges thereof have various angles. Due to this, it is unlikely to occur that the edge, which is detected as a part of the futon 213, etc., is integrated so that an edge having a longer length is generated.

In step S1105, the linearity determiner 833 determines whether the length of the edge which is generated by the integration in step S1104 is greater than or equal to the predetermined length ($L_1$). When it is determined that the length of the edge is less than the predetermined length (NO in step S1105), the process goes to step S1107. In step S1107, the linearity determiner 833 excludes the edge from the "one-side candidate". By doing this, for example when a part of the futon 213 is detected as the edge, the edge can be excluded from the "one-side candidate".

On the other hand, when it is determined that the length of the edge is greater than or equal to the predetermined length (YES in step S1105), the process goes to step S1106. In step S1106, the linearity determiner 833 determines the edge, which is determined to have the length greater than or equal to the predetermined length, as the "one-side candidate".

In step S1108, the linearity determiner 833 stores (records) the identification number of the edge, which is determined as the "one-side candidate", in the "first hierarchy" of the bed area candidate information 700.

In step S1109, the edge angle determiner 832 determines whether the first hierarchy process is performed on all edges which are extracted by the image acquisition section 810. When it is determined that there is an edge on which the first hierarchy process has not been performed (NO in step S1109), the process goes back to step S1101 to perform a similar process on the next edge. On the other hand, when it is determined that the first hierarchy process is performed on all edges (YES in step S1109), the first hierarchy process ends.

Figure 12:
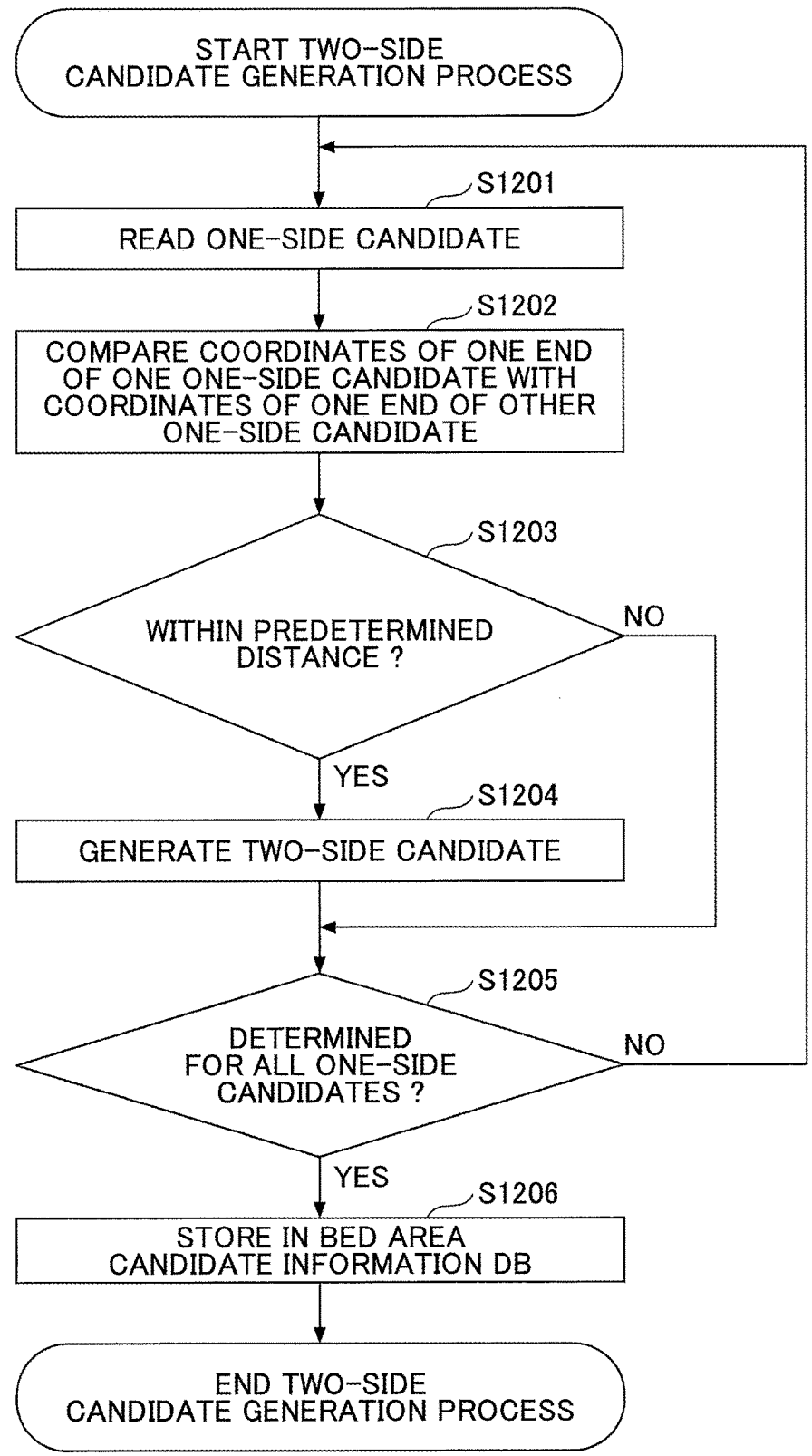
FIG. 12 is a flowchart of an example of a generation process of generating a two-side candidate.

Next, details of the generation process of generating the "two-side candidate" (in step S906) are described. FIG. 12 is a flowchart of an example of the generation process of generating the "two-side candidate".

In step S1201, the two-side combiner 840 reads the "one-side candidates" one after another which are recorded in the bed area candidate information 700. In step S1202, the two-side combiner 840 compares the coordinates of the ends of one read "one-side candidate" on the captured image with the coordinate of the ends of the other "one-side candidate" on the captured image. Note that the term "other "one-side candidate"" herein refers to (includes) all of the "one-side candidates" which are recorded in the bed area candidate information 700 but excluding the one read "one-side candidate".

In step S1203, the two-side combiner 840 determines whether the positions of the ends of the one read "one-side candidate" are located within a predetermined distance from the positions of the ends of the other "one-side candidate". When it is determined that the positions of the ends of the one read "one-side candidate" are located within a predetermined distance from the positions of the ends of the other "one-side candidate" (YES in step S1203), the process goes to step S1204. In step S1204, the two-side combiner 840 determines that the one read "one-side candidate" and the other "one-side candidate" cross each other, and generates the "two-side candidate" (in an L shape) by combining the one read "one-side candidate" and the other "one-side candidate", and then, the process goes to step S1205.

On the other hand, when it is determined that the positions of the ends of the one read "one-side candidate" are not located within a predetermined distance from the positions of the ends of the other "one-side candidate" (NO in step S1203), the process goes to step S1205 directly.

In step S1205, the two-side combiner 840 determines whether the determination is performed on all of the "one-side candidates". When it is determined that there exists a "one-side candidate" on which the determination is not performed, the process goes back to step S1201 to read the next "one-side candidate", so that similar process are performed thereon.

On the other hand, when it is determined that the determination is performed on all of the "one-side candidates", the process goes to step S1206. In step S1206, the two-side combiner 840 records the generated "two-side candidates" in the "second hierarchy" of the bed area candidate information 700.

Figure 13:
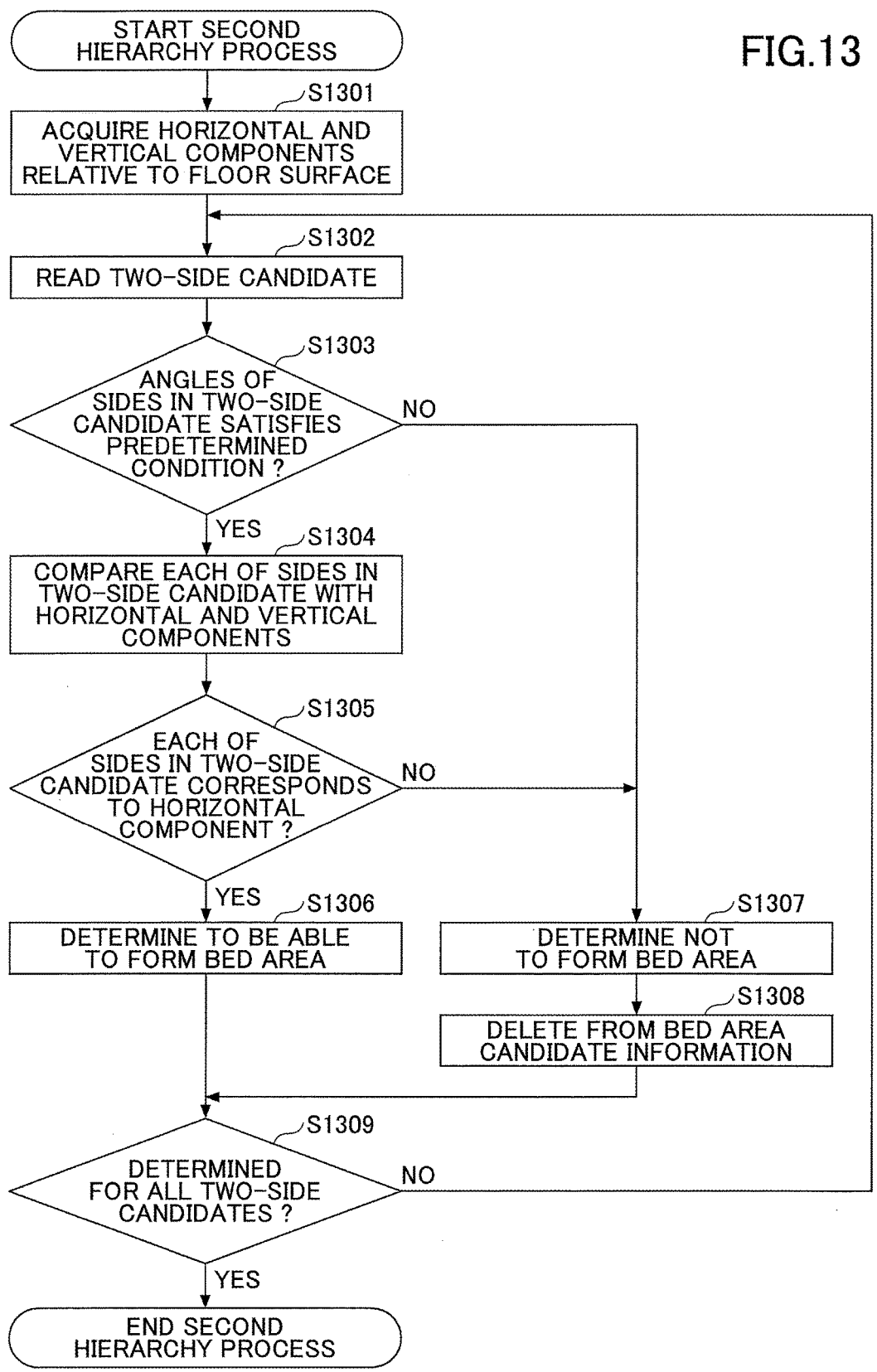
FIG. 13 is a flowchart of an example second hierarchy process.

Next, details of the second hierarchy process (in step S907) are described. FIG. 13 is a flowchart of an example of the second hierarchy process.

In step S1301, the horizon surface determiner 852 acquires a horizontal component and a vertical component relative to the floor surface which is imaged in the captured image.

In step S1302, the two-side angle determiner 851 reads the "two-side candidates" one after another recorded in the bed area candidate information 700.

In step S1303, the two-side angle determiner 851 determines whether the angle between the two sides of the read "two-side candidate" (angle between the edges which cross each other) is within the predetermined angle range (greater than or equal to "$\theta_3$" and less than "$\theta_4$"). When it is determined that the angle is not within the predetermined angle range (NO in step S1303), the process goes to step S1307. In step S1307, the two-side angle determiner 851 determines that the read "two-side candidate" may not form the bed area 140. In step S1308, the two-side angle determiner 851 excludes the read "two-side candidate" from the bed area candidate information 700.

On the other hand, when it is determined that the angle is within the predetermined angle range (YES in step S1303), the process goes to step S1304.

In step S1304, the horizon surface determiner 852 compares each of the sides (edges) of the "two-side candidate", whose angle is determined to be within the predetermined angle range, with the horizontal component and the vertical component relative to the floor surface. In step S1305, the horizon surface determiner 852 determines whether each of the sides (edges) of the "two-side candidate" corresponds to the horizontal component.

When it is determined that one or both of the sides of the "two-side candidate" do not correspond to the vertical component (NO in step S1305), the process goes to step S1307. In step S1307, the two-side angle determiner 851 determines that the read "two-side candidate" may not form the bed area 140. In step S1308, the two-side angle determiner 851 excludes the read "two-side candidate" from the bed area candidate information 700.

On the other hand, when it is determined that each of the sides (edges) of the "two-side candidate" corresponds to the horizontal component (YES in step S1305), the process goes to step S1306. In step S1306, the two-side angle determiner 851 determines that the read "two-side candidate" may form the bed area 140.

In step S1309, the two-side angle determiner 851 determines whether the second hierarchy process is performed on all "two-side candidates" recorded in the bed area candidate information 700. When it is determined that there exists a "two-side candidates" on which the second hierarchy process has not performed (NO in step S1309), the process goes back to step S1302.

On the other hand, when it is determined that the second hierarchy process is performed on all "two-side candidates" recorded in the bed area candidate information 700 (YES in step S1309), the second hierarchy process ends.

Figure 14:
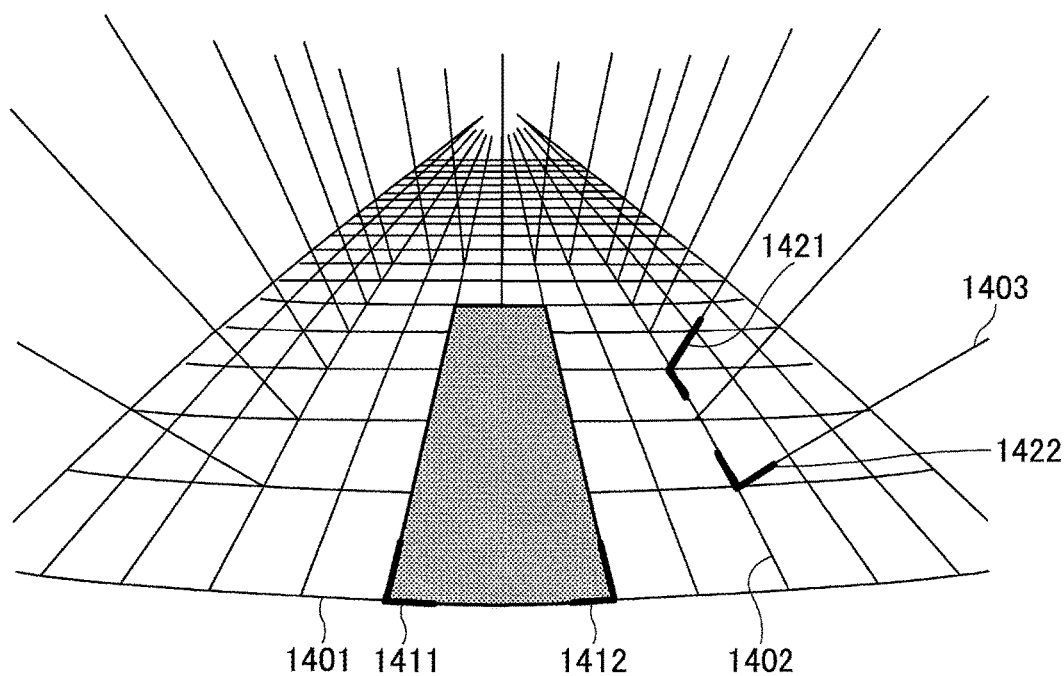
FIG. 14 illustrates a horizontal component and a vertical component.

FIG. 14 illustrates the horizontal component and the vertical component. The horizontal components 1401 and 1402, and the vertical component 1403 relative to the floor surface imaged in the captured image may be defined in advance, or may be calculated based on the nth frame of the captured image by the horizon surface determiner 852. The example of FIG. 14 illustrates that, among the "two-side candidates" 1411, 1412, 1421, and 1422, each of the "two-side candidates" 1411 and 1412 corresponds to the horizontal component. On the other hand, one of the sides of the "two-side candidates" 1421 and 1422 corresponds to the horizontal component, but the other of the sides of the "two-side candidates" 1421 and 1422 corresponds to the vertical component.

Therefore, according to the example of FIG. 14, the horizon surface determiner 852 excludes the "two-side candidates" 1421 and 1422 from the bed area candidate information 700. By doing this, for example, even when a part of the wall or the curtain 221 is extracted as the "two-side candidate", the "two-side candidate" can be excluded because the "two-side candidate" is determined as the "two-side candidate" that may not form the bed area 140.

Figure 15:
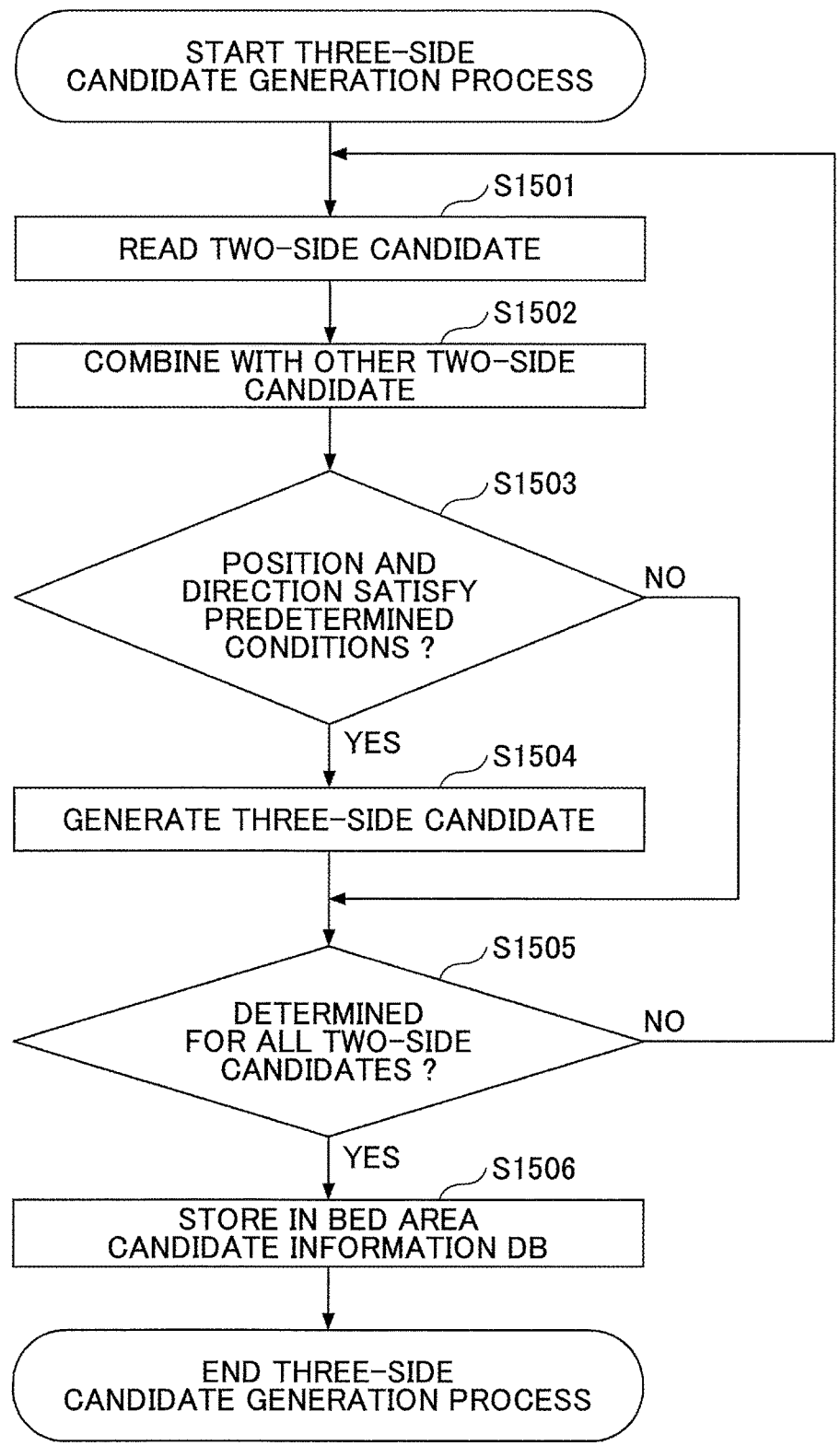
FIG. 15 is a first flowchart of an example of a generation process of generating a three-side candidate.

Next, details of the generation process of generating the "three-side candidate" (in step S908) are described. FIG. 15 is a flowchart of an example of the generation process of generating the "three-side candidate".

In step S1501, the three-side combiner 860 reads the "two-side candidates" one after another recorded in the bed area candidate information 700. In step S1502, the three-side combiner 860 combines the one read "two-side candidate" with other "two-side candidate" recorded in the bed area candidate information 700. Here, the term "other "two-side candidate"" refers to all "two-side candidates" recorded in the bed area candidate information 700 but excluding the one read "two-side candidate".

In step S1503, the three-side combiner 860 determines whether the position and the direction of the "two-side candidate" read in step S1501 and the position and the direction of the other "two-side candidate" satisfy the predetermined condition.

Specifically, in step S1503, the three-side combiner 860 determines whether the position and the direction of the "two-side candidate" and the position and the direction of the other "two-side candidate" have a relationship so as to form a U shape (when those "two-side candidates" are combined with each other). When it is determined they form a U shape (YES in step S1503), it is determined that the predetermined condition is satisfied. On the other hand, when it is determined they do not form a U shape (NO in step S1503), it is determined that the predetermined condition is not satisfied.

When it is determined that the predetermined condition is not satisfied (NO in step S1503), the process goes to step S1505 directly. On the other hand, when it is determined that the predetermined condition is satisfied (YES in step S1503), the process goes to step S1504.

In step S1504, the three-side combiner 860 generates the "three-side candidate" by combining the two "two-side candidates" (i.e., the read "two-side candidate" and the other "two-side candidate") which are determined to satisfy the predetermined condition, and the process goes to step S1505.

In step S1505, the three-side combiner 860 determines whether a similar process is performed on all "two-side candidates" recorded in the bed area candidate information 700. When it is determined that there exists a "two-side candidate", recorded in the bed area candidate information 700, on which the similar process has not been performed (NO in step S1505), the process goes back to step S1501.

On the other hand, when it is determined that the process has been performed on all "two-side candidates" recorded in the bed area candidate information 700 (YES in step S1505), the process goes to step S1506. In step S1506, the three-side combiner 860 records the "three-side candidate" generated in step S1504 in the "third hierarchy" of the bed area candidate information 700.

Figure 16A:
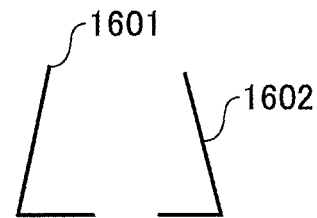
FIGS. 16A and 16B illustrate examples combinations of the two-side candidates to generate the three-side candidates.
Figure 16B:
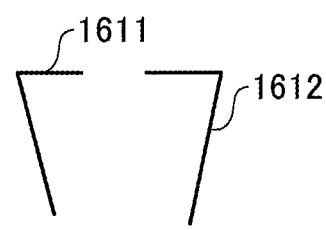
Figure 16C:
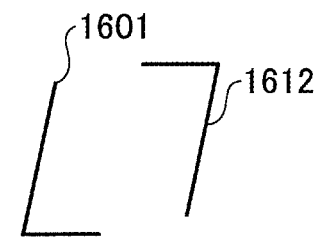
FIG. 16C illustrates an example combination of the two-side candidates.

FIGS. 16A through 16C illustrate examples of the "three-side candidates". Specifically, FIG. 16A illustrates a case where the read "two-side candidate" 1601 and the other "two-side candidate" 1602 have the relationship to form a U shape, so that the "three-side candidate" can be formed by combining those "two-side candidates".

Similarly, FIG. 16B also illustrates a case where the read "two-side candidate" 1611 and the other "two-side candidate" 1612 have the relationship to form a U shape, so that the "three-side candidate" can be formed by combining those "two-side candidates".

On the other hand, FIG. 16C illustrates a case where the read "two-side candidate" 1601 and the other "two-side candidate" 1612 do not have the relationship to form a U shape (having a staggered relationship). Therefore, in this case, the read "two-side candidate" 1601 and the other "two-side candidate" 1612 are not combined with each other to generate the "three-side candidate".

Accordingly, as a result of FIGS. 16A through 16C, only the combination between the "two-side candidates" 1601 and 1602 and the combination between the "two-side candidates" 1611 and 1612 are recorded as the respective "three-side candidates" in the bed area candidate information 700. On the other hand, the combination between the "two-side candidates" 1601 and 1612 is not recorded in the bed area candidate information 700.

Figure 17:
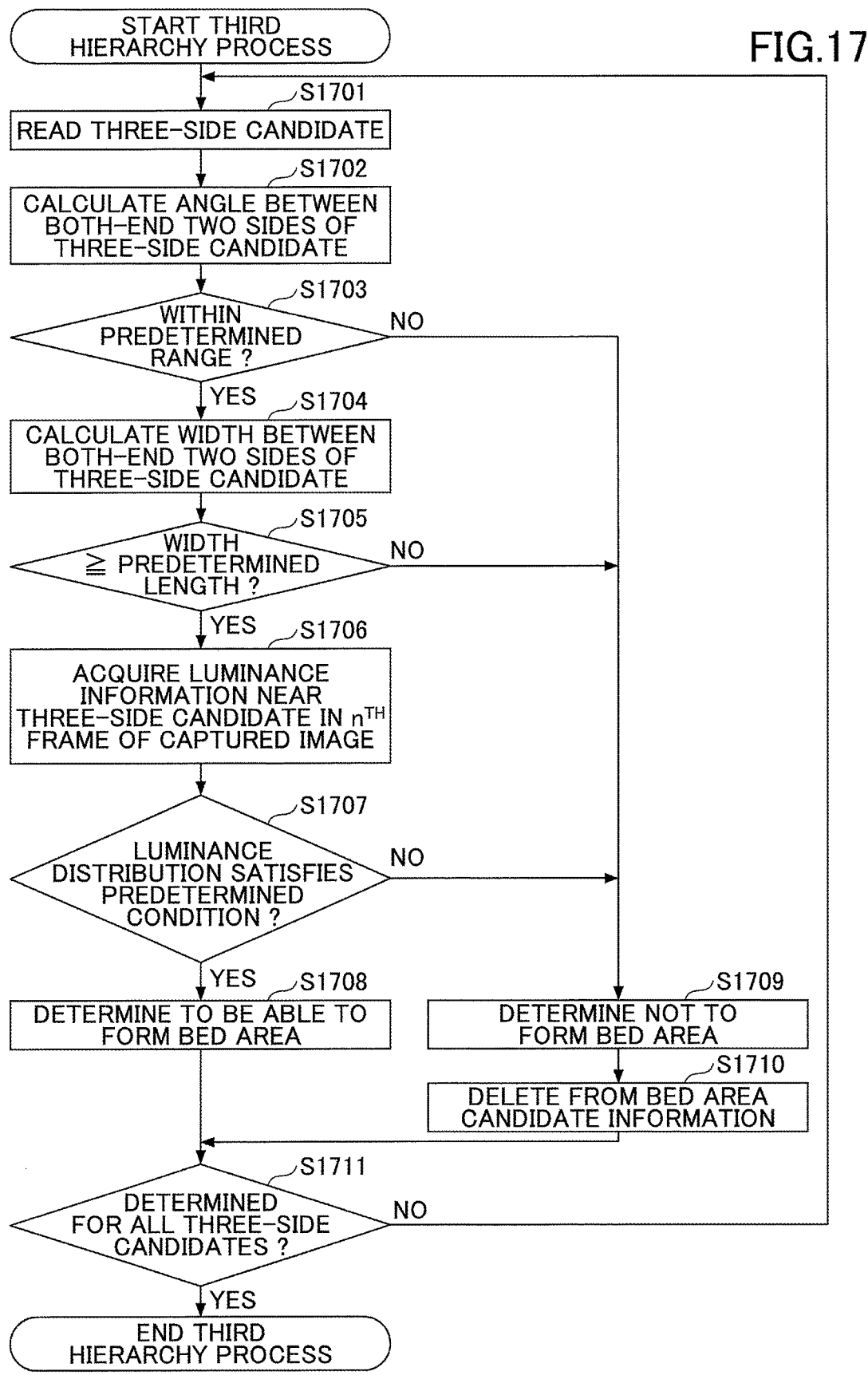
FIG. 17 is a flowchart of an example third hierarchy process.

Next, details of the third hierarchy process (in step S909) are described. FIG. 17 is a flowchart of an example of the third hierarchy process.

In step S1701, the both-end two-side angle and width determiner 871 reads the "three-side candidates" one after another stored in the bed area candidate information 700.

In step S1702, the both-end two-side angle and width determiner 871 calculates the angle of the "both-end two sides" (angle between the edges which cross to each other) of the "three-side candidate" read in step S1701. In step S1703, the both-end two-side angle and width determiner 871 determines whether the angle, which is calculated in step S1702, is within the predetermined angle range (greater than or equal to "$\theta_5$" and less than "$\theta_6$").

When it is determined that the angle is not within the predetermined angle range (NO in step S1703), the process goes to step S1709. In step S1709, the both-end two-side angle and width determiner 871 determines that the read "three-side candidate" may not form the bed area 140. In step S1710, the both-end two-side angle and width determiner 871 excludes the read "three-side candidate" from the bed area candidate information 700.

On the other hand, when it is determined that the angle is within the predetermined angle range (YES in step S1703), the process goes to step S1704. In step S1704, the both-end two-side angle and width determiner 871 calculates the width between the "both-end two sides" of the "three-side candidate". In step S1705, both-end two-side angle and width determiner 871 determines whether the width between the "both-end two sides" of the "three-side candidate" is greater than or equal to the predetermined length ($L_2$).

When it is determined that the width between the "both-end two sides" is less than the predetermined length (NO in step S1705), the process goes to step S1709. In step S1709, the both-end two-side angle and width determiner 871 determines that the read "three-side candidate" may not form the bed area 140. In step S1710, the both-end two-side angle and width determiner 871 excludes the read "three-side candidate" from the bed area candidate information 700.

On the other hand, when it is determined that the width between the "both-end two sides" is greater than or equal to the predetermined length (YES in step S1705), the process goes to step S1706. In step S1706, the luminance change determiner 872 acquires the luminance information near the "three-side candidate" from the nth frame of the captured image.

In step S1707, based on the luminance information acquired in step S1706, the luminance change determiner 872 determines whether the luminance distribution near the "both-end two sides" of the "three-side candidate" satisfies a predetermined condition.

When it is determined that the luminance distribution does not satisfy the predetermined condition (NO in step S1707), the process goes to step S1709. In step S1709, the luminance change determiner 872 determines that the "three-side candidate" may not form the bed area 140. In step S1710, the luminance change determiner 872 excludes the "three-side candidate" from the bed area candidate information 700.

On the other hand, when it is determined that the luminance distribution satisfies the predetermined condition (YES in step S1707), the process goes to step S1708. In step S1708, the luminance change determiner 872 determines that the "three-side candidate" may form the bed area 140.

In step S1711, the both-end two-side angle and width determiner 871 determines whether the third hierarchy process is performed on all "three-side candidates". When it is determined that there exists a "three-side candidate" on which the third hierarchy process is not performed (NO in step S1711), the process goes back to step S1701 to read the next "three-side candidate".

On the other hand, when it is determined that the third hierarchy process is performed on all "three-side candidates" (YES in step S1711), the third hierarchy process ends.

Next, the luminance distribution is described with reference to FIGS. 18A through 19B, which is determined by the luminance change determiner 872 in step S1708 of the third hierarchy process (FIG. 17). FIGS. 18A through 19B illustrate the luminance distribution near the "three-side candidate".

Figure 18A:
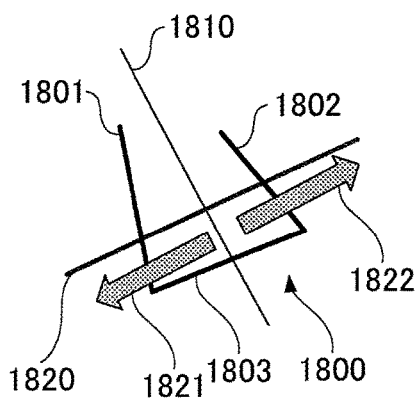
FIGS. 18A through 18C illustrate examples of luminance distribution near the three-side candidate.

As illustrated in FIG. 18A, the "three-side candidate" 1800 includes the "both-end two sides" 1801 and 1802, and the center one side 1803 having both ends which are connected the respective one ends of the "both-end two sides" 1801 and 1802 (the center one side 1803 is located between the "both-end two sides" 1801 and 1802 and corresponds to the center part of the U shape of the "three-side candidate"). Further, the line 1810 passes through the center of the center one side 1803 in a manner such that the line 1810 is orthogonal to the center one side 1803. The luminance change determiner 872 detects the luminance change in the nth frame of the captured image when the line 1810 moves in the arrow 1821 direction (toward the line 1801) on the straight line 1820. Further, the luminance change determiner 872 detects the luminance change in the nth frame of the captured image when the line 1810 moves in the arrow 1822 direction (toward the line 1802) on the straight line 1820.

Figure 18B:
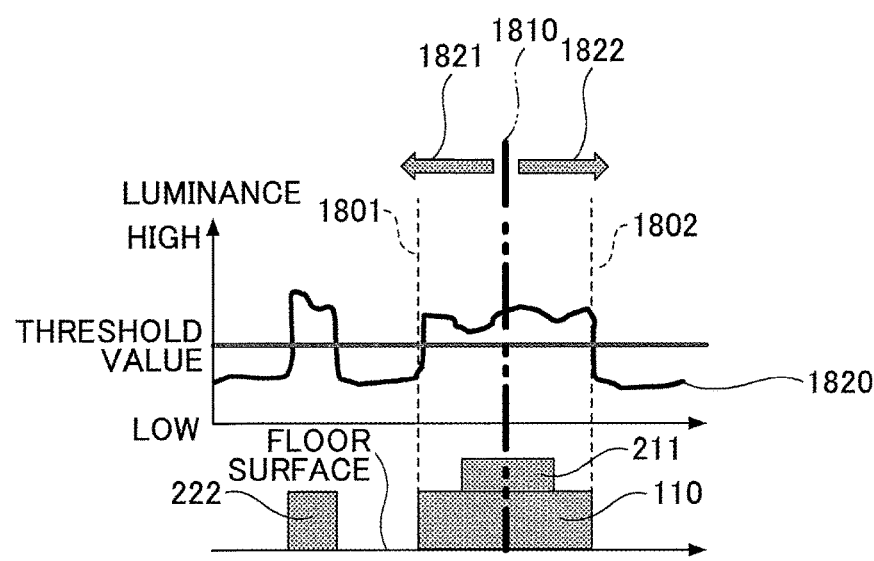

FIGS. 18B through 19B illustrate respective examples of the luminance change. Specifically, FIG. 18B illustrates an example of the luminance change when the "both-end two sides" 1801 and 1802 of the "three-side candidate" correspond to the edges of the bed 110. The luminance value of the bed 110 is high and the luminance value of the floor surface is low. Therefore, as illustrated in FIG. 18B, when the position moves from the position of the line 1810 in the arrow 1821 direction, the luminance value changes from a high luminance value to a low luminance value before and after the position of the side 1801. Similarly, when the position moves from the position of the line 1810 in the arrow 1822 direction, the luminance value changes from a high luminance value to a low luminance value before and after the position of the side 1802.

Figure 18C:
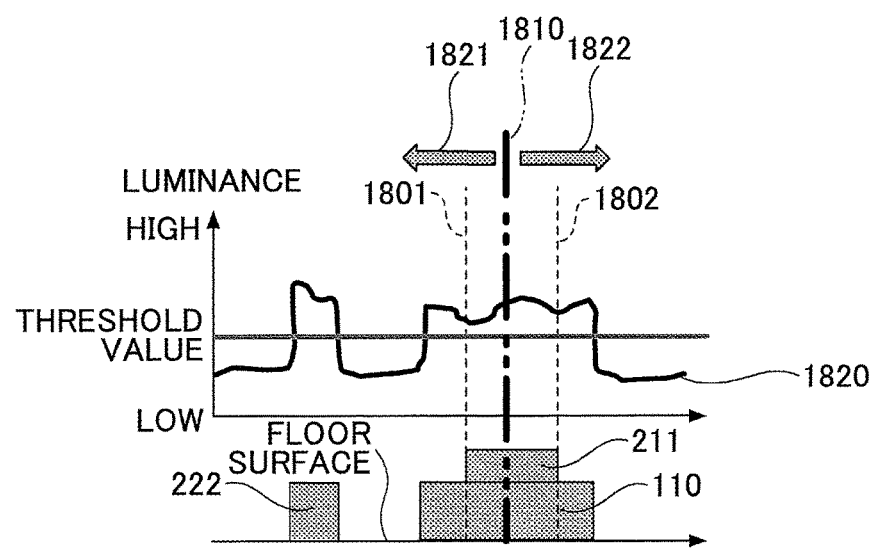

FIG. 18C illustrates an example of the luminance change when the "both-end two sides" 1801 and 1802 of the "three-side candidate" correspond to the edges of the pillow 211. The luminance value of the pillow 211 is high and the luminance value of the bed 110 is also high. Therefore, as illustrated in FIG. 18C, even when the position moves from the position of the line 1810 in the arrow 1821 direction, the luminance value does not change before and after the position of the side 1801 (a high luminance value remains). Similarly, even when the position moves from the position of the line 1810 in the arrow 1822 direction, the luminance value does not change before and after the position of the side 1802 (a high luminance value remains).

Figure 19A:
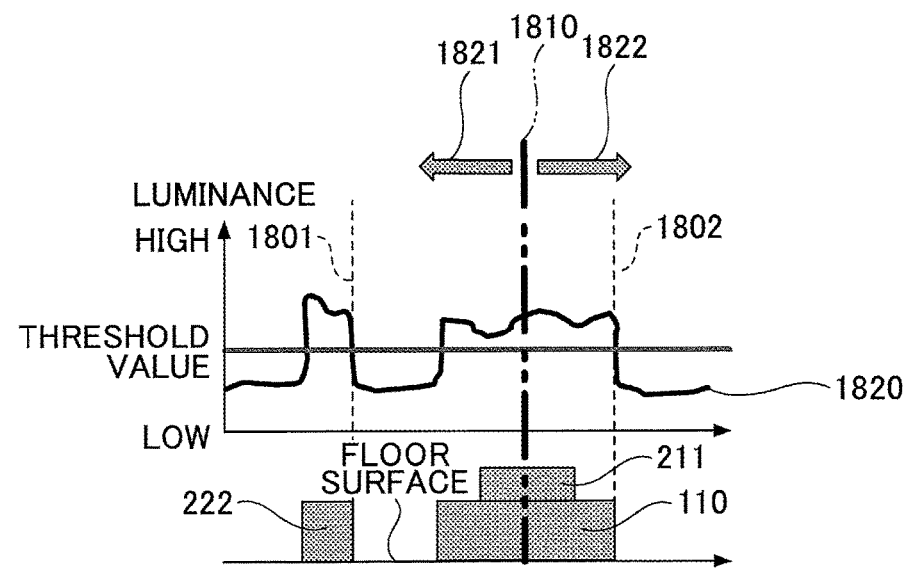
FIGS. 19A and 19B illustrate other examples of the luminance distribution near the three-side candidate.

FIG. 19A illustrates an example of the luminance change when one of the "both-end two sides" 1801 and 1802 of the "three-side candidate" corresponds to the edge of the chair 222, and the other of the "both-end two sides" 1801 and 1802 corresponds to the edge of the bed 110. The luminance values of the bed 110 and the chair 222 is high and the luminance value of the floor surface is low. Therefore, as illustrated in FIG. 19A, when the position moves from the position of the line 1810 in the arrow 1821 direction, the luminance value changes first from a high luminance value to a low luminance value, and further changes from a low luminance value to a high luminance value before and after the position of the side 1801. On the other hand, when the position moves from the position of the line 1810 in the arrow 1822 direction, the luminance value changes from a high luminance value to a low luminance value before and after the position of the side 1802.

Figure 19B:
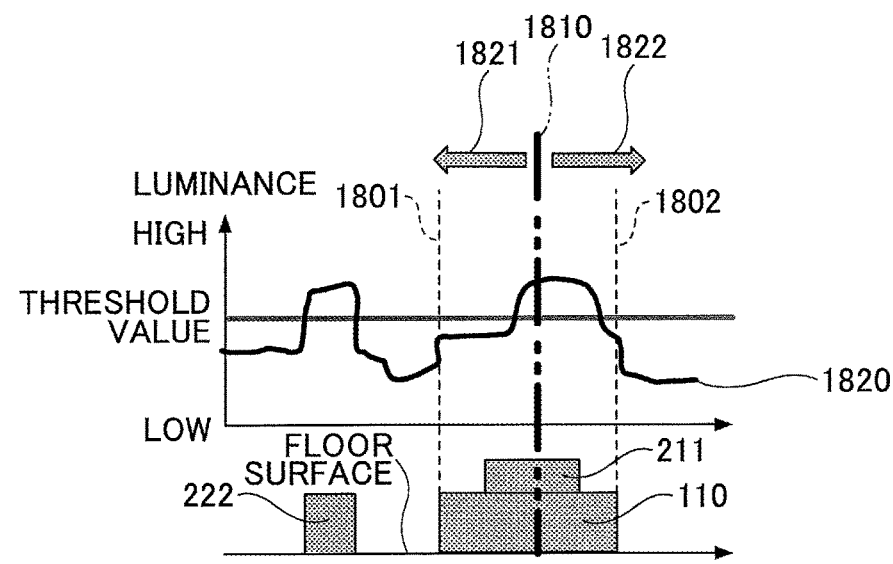

FIG. 19B illustrates an example of the luminance change in a case where, although the "both-end two sides" 1801 and 1802 of the "three-side candidate" correspond to the edges of the bed 110, the luminance near the bed 110 is not sufficient. The luminance value of the pillow 211 on the bed 110 is high, the luminance value of the bed 110 is somewhat lower (middle), and the luminance value of the floor surface is further lower (low). Therefore, as illustrated in FIG. 19B, when the position moves from the position of the line 1810 in the arrow 1821 direction, the luminance value changes from a high luminance value to a low luminance value (regardless of the position of the side 1801, though). Similarly, when the position moves from the position of the line 1810 in the arrow 1822 direction, the luminance value changes from a high luminance value to a low luminance value (regardless of the position of the side 1802, though).

As described, when the luminance change is detected near the "both-end two sides" of the "three-side candidate" in the directions designated in FIG. 18A, the following features can be understood based on the examples of FIGS. 18B through 19B.

When the "both-end two sides" 1801 and 1802 of the "three-side candidate" correspond to the edges of the bed 110, the luminance value changes from a high luminance value to a low luminance value before and after each of the "both-end two sides" 1801 and 1802 regardless of the luminance near the bed 110.

When at least one of the "both-end two sides" 1801 and 1802 of the "three-side candidate" does not correspond to the edge of the bed 110, the luminance value does not change from a high luminance value to a low luminance value before and after each of the "both-end two sides" 1801 and 1802.

Accordingly, based on the uniformity of the luminance distribution near the "both-end two sides" of the "three-side candidate", it becomes possible for the luminance change determiner 872 to determine whether the "three-side candidate" may form the bed area 140. By doing this, even when a part of the pillow 211 or a part of the chair 222 is detected as the "three-side candidate", it becomes possible to determine that the "three-side candidate" cannot form the bed area 140 and exclude the "three-side candidate".

Figure 20:
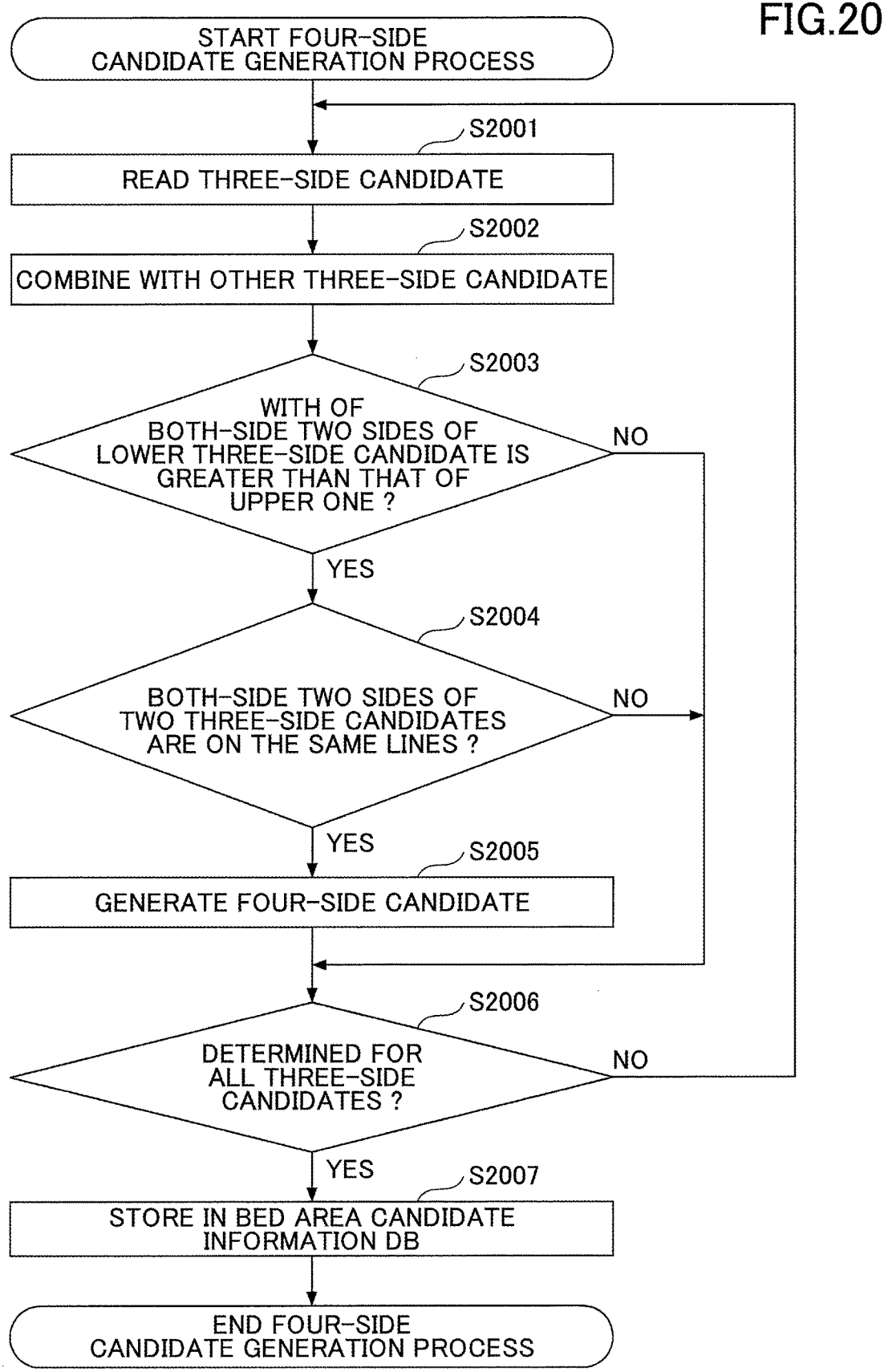
FIG. 20 is a flowchart of an example of a generation process of generating a four-side candidate.

Next, details of the generation process of generating the "four-side candidate" (in step S910) are described. FIG. 20 is a flowchart of an example of the generation process of the "three-side candidate".

In step S2001, the four-side combiner 880 reads the "three-side candidates" one after another recorded in the bed area candidate information 700. In step S2002, the four-side combiner 880 combines one read "three-side candidate" with the other "three-side candidate". Here, the "other "three-side-candidate"" includes all "three-side-candidates" recorded in the bed area candidate information 700 but excluding the one read "three-side candidate". The four-side combiner 880 performs the combining in a case where the one read "three-side candidate" and the other "three-side candidate" have a positional relationship that the opening section (apertural area) of the U shape of the one read "three-side candidate" faces the opening section of the U shape of the other "three-side candidate".

In step S2003, the four-side combiner 880 compares the width between the "both-end two sides" of the "three-side candidate" which is positioned on a lower side with the width between the "both-end two sides" of the "three-side candidate" which is positioned on an upper side on the captured image upon being combined with each other. As a result, when it is determined that the width between the "both-end two sides" of the "three-side candidate" which is positioned on the upper side is greater than the width between the "both-end two sides" of the "three-side candidate" which is positioned on the lower side (NO in step S2003), the process goes to step S2006.

On the other hand, when it is determined that the width between the "both-end two sides" of the "three-side candidate" which is positioned on the lower side is greater than the width between the "both-end two sides" of the "three-side candidate" which is positioned on the upper side (YES in step S2003), the process goes to step S2004. In step S2004, the four-side combiner 880 determines whether the "both-end two sides" of the "three-side candidate" which are positioned on the lower side and the "both-end two sides" of the "three-side candidate" which are positioned on the upper side are positioned on the same lines.

When it is determined that the "both-end two sides" on the lower side and the "both-end two sides" on the upper side are not positioned on the same lines (NO in step S2004), the process goes to step S2006. On the other hand, when it is determined that the "both-end two sides" on the lower side and the "both-end two sides" on the upper side are positioned on the same lines (YES in step S2004), the process goes to step S2005.

In step S2005, the four-side combiner 880 generates the "four-side candidate" by combining the one read "three-side candidate" with the other "three-side candidate". That is, the four-side combiner 880 generates the "four-side candidate" by combining the one read "three-side candidate" with the other "three-side candidate" each of which satisfies the conditions in step S2003 and s2004. The four-side combiner 880, however, does not generate the "four-side candidate" when the one read "three-side candidate" and the other "three-side candidate" do not satisfy any of the conditions in step S2003 and S2004.

In step S2006, the four-side combiner 880 determines whether the above determination is performed on all "three-side candidate" in the bed area candidate information 700. When it is determined that there exists a "three-side candidate" on which the determination is not performed (NO in step S2006), the process goes back to step S2001 to read the next "three-side candidate".

On the other hand, when it is determined that the determination is performed on all "three-side candidates" (YES in step S2006), the process goes to step S2007. In step S2007, the generated "four-side candidate" is stored in the "fourth hierarchy" in the bed area candidate information 700.

Figure 21A:
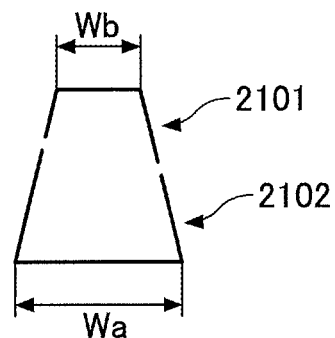
FIGS. 21A and 21B illustrate examples combinations of the three-side candidates to generate the four-side candidates.

Next, specific examples of the generation process of generating the "four-side candidate" performed by the four-side combiner 880 are described with reference to FIGS. 21A through 21C. FIG. 21A illustrates a case where the "three-side candidate" 2101 is combined with the "three-side candidate" 2102.

In the example of FIG. 21A, the width "Wa" between the "both-end two sides" of the "three-side candidate" 2102 on the lower side is greater than the width "Wb" between the "both-end two sides" of the "three-side candidate" 2101 on the upper side. Further, the "both-end two sides" of the "three-side candidate" 2102 on the lower side and the "both-end two sides" of the "three-side candidate" 2101 on the upper side are on the same lines. Therefore, the four-side combiner 880 combines the "three-side candidate" 2101 with the "three-side candidate" 2102 to generate the "four-side candidate".

Figure 21B:
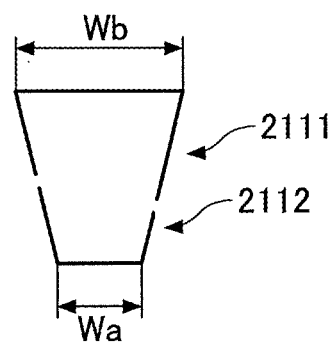

On the other hand, FIG. 21B illustrates a case where the "three-side candidate" 2111 is combined with the "three-side candidate" 2112. In the example of FIG. 21B, the width "Wb" between the "both-end two sides" of the "three-side candidate" 2111 on the upper side is greater than the width "Wa" between the "both-end two sides" of the "three-side candidate" 2112 on the lower side. The shape of the bed area 140 is rectangular. Due to this, in the captured image, the width on the side closer to the imaging apparatus 120 (the lower side in the captured image) is greater than the width on the side farther to the imaging apparatus 120 (the upper side in the captured image). Therefore, based on the combination between the "three-side-candidate" having a lesser width on the lower side and the "three-side-candidate" having a greater width on the upper side, it cannot form the bed area 140. Accordingly, the four-side combiner 880 does not generate the "four-side candidate" based on the combination between the "three-side-candidate" 2111 and the "three-side-candidate" 2112.

Figure 21C:
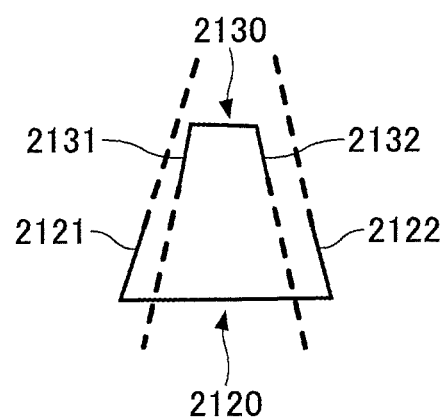
FIG. 21C illustrates an example combination of the three-side candidates.

FIG. 21C illustrates a case where the "three-side candidate" 2120 is combined with the "three-side candidate" 2130. In the example of FIG. 21C, the width between the "both-end two sides" 2121 and 2122 of the "three-side candidate" 2120 on the lower side is greater than the width between the "both-end two sides" 2131 and 2132 of the "three-side candidate" 2130 on the upper side. However, the "both-end two sides" 2121 and 2122 on the lower side and the "both-end two sides" 2131 and 2132 on the upper side are not on the same lines. Due to this, the four-side combiner 880 does not generate the "four-side candidate" based on the combination between the "three-side-candidate" 2120 and the "three-side-candidate" 2130.

Figure 22:
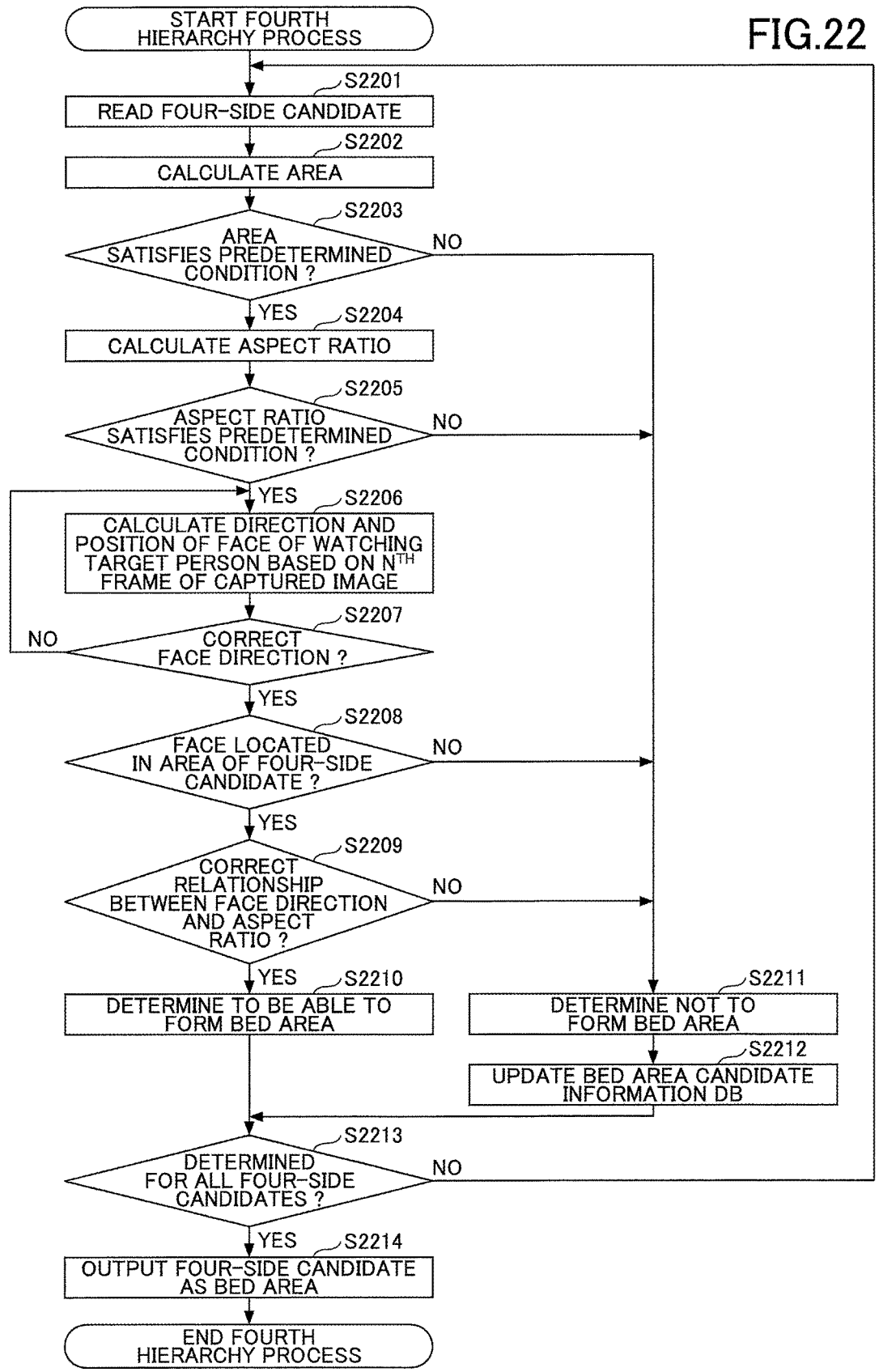
FIG. 22 is a flowchart of an example fourth hierarchy process.

Next, details of the fourth hierarchy process (in step S911) are described. FIG. 22 is a flowchart of an example of the fourth hierarchy process.

In step S2201, the area and aspect ratio determiner 891 reads the "four-side candidates" one after another recorded in the bed area candidate information 700.

In step S2202, the area and aspect ratio determiner 891 calculates the area of the rectangular area defined by the read "four-side candidate". In step S2203, the area and aspect ratio determiner 891 determines whether the area, which is calculated in step S2202, is within the predetermined range (greater than or equal to "$S_1$" and less than "$S_2$").

When it is determined that the area is outside the predetermined range (NO in step S2203), the process goes to step S2211. In step S2211, the area and aspect ratio determiner 891 determines that the read "four-side candidate" may not form the bed area 140. Further, in step S2212, the area and aspect ratio determiner 891 excludes the read "four-side candidate" from the bed area candidate information 700.

On the other hand, when it is determined that the area is within the predetermined range (YES in step S2203), the process goes to step S2204. In step S2204, the area and aspect ratio determiner 891 calculates the aspect ratio of the rectangular area defined by the read "four-side candidate". In step S2205, the area and aspect ratio determiner 891 whether the aspect ratio, which is calculated in step S2204, is within the predetermined range (greater than or equal to "$R_1$" and less than "$R_2$").

When it is determined that the aspect ratio is outside the predetermined range (NO in step S2205), the process goes to step S2211. In step S2211, the area and aspect ratio determiner 891 determines that the read "four-side candidate" may not form the bed area 140. Further, in step S2212, the area and aspect ratio determiner 891 excludes the read "four-side candidate" from the bed area candidate information 700.

On the other hand, when it is determined that the aspect ratio is within the predetermined range (YES in step S2205), the process goes to step S2206. In step S2206, the head position and direction determiner 892 detects the face of the watching target person 200 from the nth frame of the captured image, and calculates the direction and the position of the detected face.

In step S2207, the head position and direction determiner 892 determines whether the direction of the face of the watching target person 200 corresponds to a correct direction. When the watching target person 200 lies on the bed 110, the head is positioned on the side closer to the imaging apparatus 120 (the lower side of the captured image). Therefore, when the face detected in step S2206 is not arranged on the lower side of the captured image as the head, the detected face is more likely to be a face of a person (e.g., a caregiver 223) other than the watching target person 200.

Therefore, when it is determined that the direction of the face does not correspond to a correct direction (NO in step S2207), the process goes back to step S2206, so as to detect the face of the watching target person 200. On the other hand, when it is determined that the direction of the face corresponds to a correct direction (YES in step S2207), the process goes back to step S2208.

In step S2208, the head position and direction determiner 892 determines whether the face, which is detected in step S2206, is positioned in a predetermined area in the rectangular area defined by the read "four-side candidate". In a case where the read "four-side candidate" corresponds to the bed area 140, it is thought that the face of the watching target person 200 is positioned in the area on the lower side (on the side closer to the imaging apparatus 120) in the rectangular area defined by the "four-side candidate".

When it is determined that the face is not positioned in the predetermined area (NO in step S2208), the process goes to step S2211. In step S2211, the head position and direction determiner 892 determines that the read "four-side candidate" may not form the bed area 140. Further, in step S2212, the head position and direction determiner 892 excludes the read "four-side candidate" from the bed area candidate information 700.

On the other hand, when it is determined that the face is positioned in the predetermined area (YES in step S2208), the process goes to step S2209. In step S2209, the head position and direction determiner 892 further determines whether the horizontal and vertical relationship based on the direction of the face (face direction) which is detected in step S2206 corresponds to the horizontal and vertical relationship based on the aspect ratio of the rectangular area defined by the read "four-side candidate". The shape of the bed area 140 is rectangular. Therefore, in a case where the read "four-side candidate" corresponds to the bed area 140, the face direction of the watching target person 200 corresponds to the longitudinal side of the read "four-side candidate".

When it is determined that the horizontal and vertical relationship based on the face direction) does not correspond to that based on the aspect ratio of the rectangular area (NO in step S2209), the process goes to step S2211. In step S2211, the head position and direction determiner 892 determines that the read "four-side candidate" may not form the bed area 140. Further, in step S2212, the head position and direction determiner 892 excludes the read "four-side candidate" from the bed area candidate information 700.

On the other hand, when it is determined that the horizontal and vertical relationship based on the face direction corresponds to the horizontal and vertical relationship based on the aspect ratio of the rectangular area (YES in step S2209), the process goes to step S2210. In step S2210, the head position and direction determiner 892 determines that the read "four-side candidate" may form the bed area 140.

In step S2213, the area and aspect ratio determiner 891 determines whether the fourth hierarchy process is performed on all "four-side candidates" recorded in the bed area candidate information 700. When it is determined that there exists a "four-side candidate" on which the fourth hierarchy process is not performed (NO is step S2213), the process goes back to step S2201 to perform a similar process on the next "four-side candidate".

On the other hand, when it is determined that the fourth hierarchy process is performed on all "four-side candidates" (YES in step S2213), the process goes to step S2214. In step S2214, the head position and direction determiner 892 outputs the "four-side candidate", which remains in the bed area candidate information 700 without having been deleted, as the bed area 140.

Figure 23:
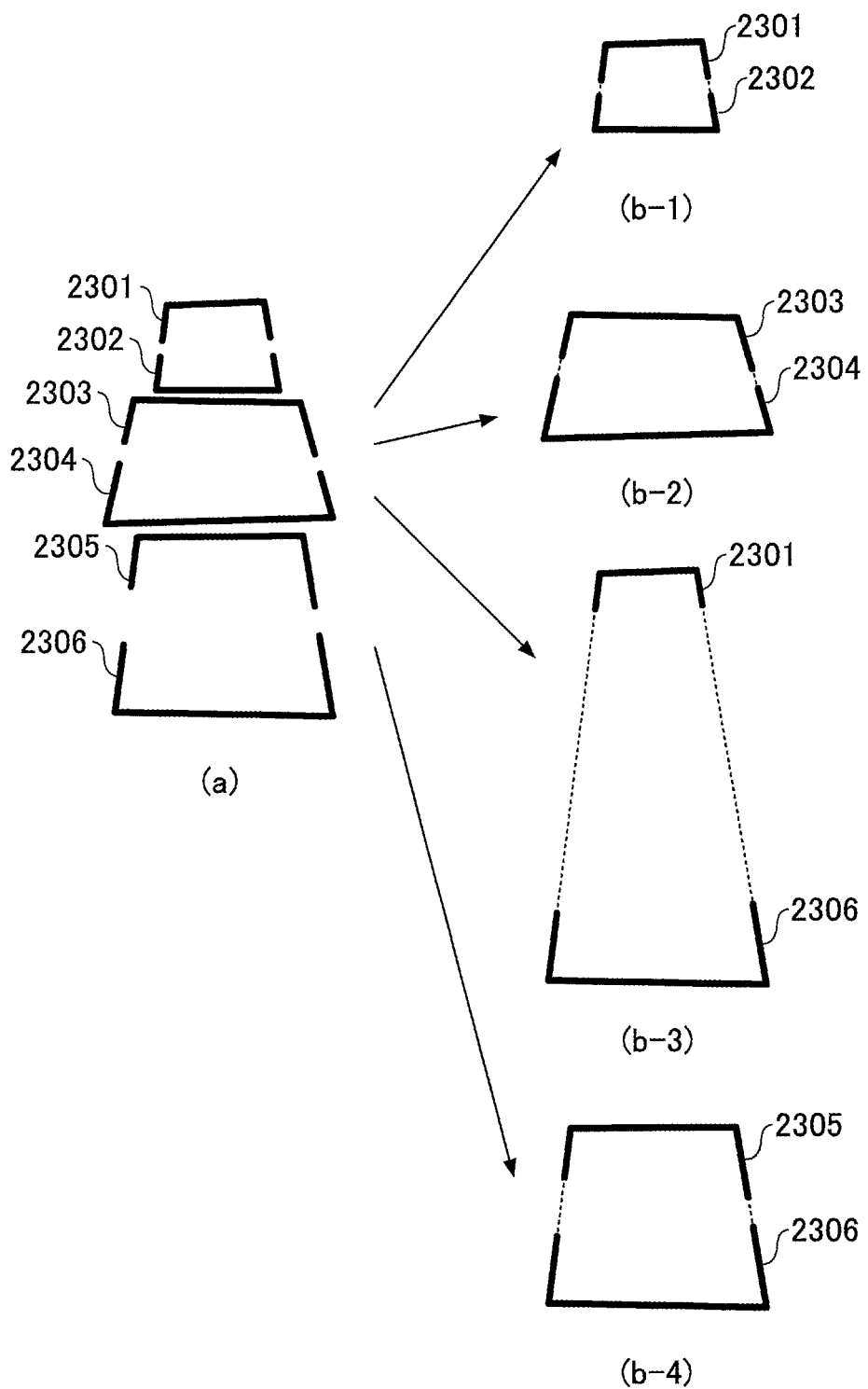
FIG. 23 illustrates examples of four-side candidates having different areas and aspect ratios.

Next, specific examples of the fourth hierarchy process performed by the fourth hierarchy processor 890 are described with reference to FIGS. 23 through 24E. FIG. 23 illustrates examples of the "four-side candidates" having respective areas and aspect ratios which differ from each other.

In a case where the "three-side candidates" 2301 through 2306 are extracted in the third hierarchy process as illustrated in part (a) of FIG. 23, the "four-side candidates" as illustrated in parts (b-1) through (b4) of FIG. 23 are generated as the result of the combinations in the of fourth hierarchy process which is performed on the "three-side candidates" 2301 through 2306.

Among those, the area of the "four-side candidate" of part (b-1) of FIG. 23 is not within the predetermined range (greater than or equal to "$S_1$" and less than "$S_2$"). Due to this, the area and aspect ratio determiner 891 determines that the "four-side candidate" may not form the bed area 140. Further, the aspect ratios of the "four-side candidates" of parts (b-2) and (b-4) of FIG. 23 are not within the predetermined range (greater than or equal to "$R_1$" and less than "$R_2$"). Due to this, the area and aspect ratio determiner 891 determines that the "four-side candidates" may not form the bed area 140.

On the other hand, the area and the aspect ratio of the "four-side candidate" of part (b-3) of FIG. 23 correspond to the area and the aspect ratio of the bed area 140. Due to this, the, the area and aspect ratio determiner 891 determines that the "four-side candidates" may form the bed area 140.

Further, the "four-side candidate" of part (b-2) of FIG. 23 indicates the overhead table 212 of FIG. 2. As described, the fourth hierarchy processor 890 according to this embodiment can determine that the "four-side candidate" which is included in the bed area 140 and is likely to be wrongly detected as the bed area 140 may not form the bed area 140 by using the area and the aspect ratio. As a result, it becomes possible to exclude the "four-side candidate" which is likely to be wrongly detected as the bed area 140 from the bed area candidate information 700.

FIGS. 24A through 24E illustrate examples of the face directions, the positions, and the relationship between the face direction and the direction of the "four-side candidate". FIG. 24A illustrates examples of the correct face directions of the watching target person 200 and an example of the face direction of a person other than the watching target person 200 (e.g., the caregiver 223).

As described above, in a case where the watching target person 200 lies on the bed 110, the head of the watching target person 200 is positioned on the side closer to the imaging apparatus 120. Accordingly, the head of the watching target person 200 is positioned on the lower side in the captured image. Further, the watching target person 200 may lie on his/her back on the bed 110 or may lie on the bed 110 with his/her left or right shoulder on the bed 110. Due to the variations, three types of the face directions are illustrated as the correct face direction of the watching target person 200 in the examples of FIG. 24A.

On the other hand, the head of a person other than the person who lies on the bed 110 is positioned on the upper side in the captured image. That is, the face direction of the person other than the watching target person 200 differs from the face direction of the watching target person 200. In the example of FIG. 24A, a case is illustrated where the person other than the watching target person 200 faces the direction of the imaging apparatus 120.

As described, obviously, the face direction differs between the watching target person 200 and the person other than the watching target person 200. Accordingly, it becomes possible for the head position and direction determiner 892 to determine whether the detected face is the face of the watching target person 200 or a face of a person other than the watching target person 200 by determining the direction of the face which is detected from the captured image.

FIG. 24B illustrates the area 2401 which is included in the rectangular area defined by the "four-side candidate" and where the face of the watching target person 200 is to be located. As described above, when the watching target person 200 lies on the bed 110, the head of the watching target person 200 is positioned on the side closer to the imaging apparatus 120 (on the lower side of the captured image). Due to this, the lower area 2401 selected from among the rectangular area defined by the "four-side candidate" 2400 is to be the area where the face of the watching target person 200 is to be located. The head position and direction determiner 892 determines whether the detected head of the watching target person 200 is located in the area 2401. By doing this, the head position and direction determiner 892 can determine whether the "four-side candidate" 2400 may form the bed area 140.

FIGS. 24C and 24D illustrate examples of the relationships between the rectangular areas defined by the "four-side candidates" 2410 and 2420, respectively, and the position of the face of the watching target person 200. As illustrated in FIG. 24C, when a part of the face of the watching target person 200 protrudes from the rectangular area defined by the "four-side candidate" 2410, it is determined that the "four-side candidate" 2410 cannot form the bed area 140. Therefore, in this case, the head position and direction determiner 892 excludes the "four-side candidate" 2410 from the bed area candidate information 700.

On the other hand, as illustrated in FIG. 24D, when the face of the watching target person 200 is located in the lower area of the rectangular area defined by the "four-side candidate" 2430, and (any part of) the face does not protrude from the rectangular area, it is determined that that the "four-side candidate" 2420 may form the bed area 140. Therefore, in this case, the head position and direction determiner 892 determines that the "four-side candidate" 2410 is the bed area 140.

FIG. 24E illustrates a case where the horizontal and vertical relationship based on the aspect ratio of the rectangular area defined by the "four-side candidate" 2430 does not correspond to the horizontal and vertical relationship based on face direction of the watching target person 200. In the case of the "four-side candidate" 2430 of FIG. 24E, the face of the watching target person 200 is positioned on the lower side of the rectangular area defined by the "four-side candidate" 2430. However, according to the rectangular area defined by the "four-side candidate" 2430, the side in the horizontal direction is longer and the side in the vertical direction is shorter. On the other hand, the head of the watching target person 200 is directed in the lower side direction of the captured image. The vertical direction of the actual bed 110 is to be directed in the direction from the lower side to the upper side. However, the vertical direction of the rectangular area defined by the "four-side candidate" 2430 is directed from the left side to the right side of the captured image.

That is, in the case of FIG. 24E, it is determined that the horizontal and vertical relationship based on the aspect ratio of the rectangular area defined by the "four-side candidate" 2430 does not correspond to the horizontal and vertical relationship based on face direction of the watching target person 200. Due to this, the head position and direction determiner 892 determines that the "four-side candidate" 2410 may not form the bed area 140, and deletes the "four-side candidate" 2410 from the bed area candidate information 700.

As is obvious from the above descriptions, the bed area extraction apparatus 310 divides the process of extracting the bed area 140 based on the edges extracted from the captured image into four hierarchies, and selects the candidates based on the condition(s) in each hierarchy. By doing this, it becomes possible to accurately and effectively identify the bed area 140.

Second Embodiment

In the above first embodiment, the process of extracting the bed area based on the edges extracted from the captured image is divided into four hierarchies. On the other hand, according to the second embodiment, the process of extracting the bed area based on the edges extracted from the captured image is divided into three hierarchies. In the following, details of the second embodiment are described.

Figure 25:
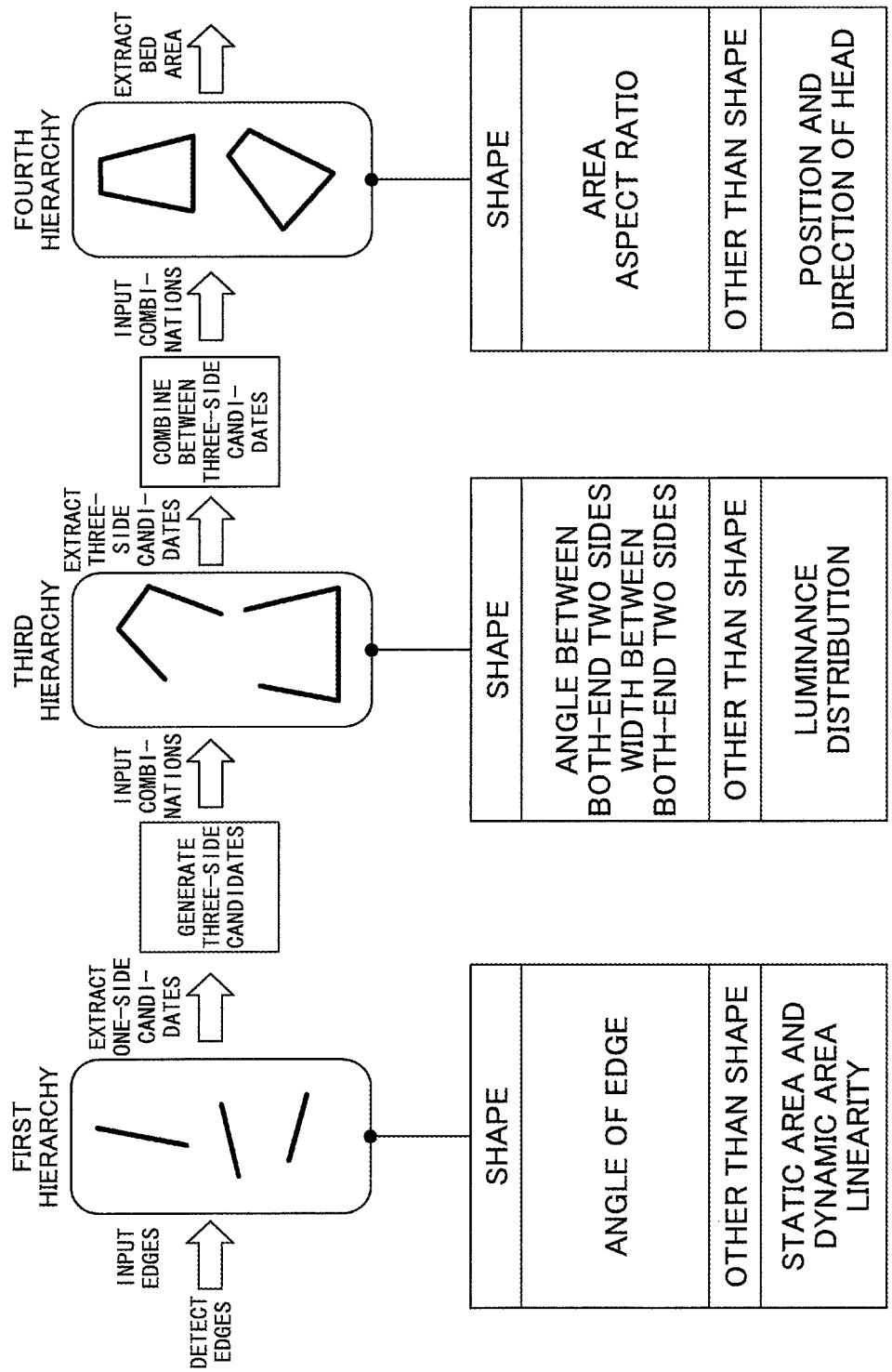
FIG. 25 is a second drawing illustrating another fundamental principle of the bed area extraction process.

First, a fundamental principle of the bed area extraction process according to the second embodiment is described. FIG. 25 illustrates the fundamental principle of the bed area extraction process according to the second embodiment. As illustrated in FIG. 25, in the second embodiment, the process of extracting the bed area based on the edges extracted from the captured image is divided into three hierarchies.

The first hierarchy in this embodiment is the same as the first hierarchy described in the above first embodiment. Therefore, the repeated description thereof is herein omitted. The "one-side candidate" extracted in the first embodiment is combined with the other two "one-side candidates" under a predetermined condition. By doing this, the "three-side candidate" is generated. The generated "three-side candidate" is input in the third hierarchy. The processes after the third hierarchy are the same as the processes described in the above first embodiment. Therefore, the repeated descriptions thereof are herein omitted.

As described, according to the second embodiment, the process in the second hierarchy is omitted from the bed area extraction process described in the above first embodiment, so that the bed area is extracted based on the three hierarchies.

Figure 26:
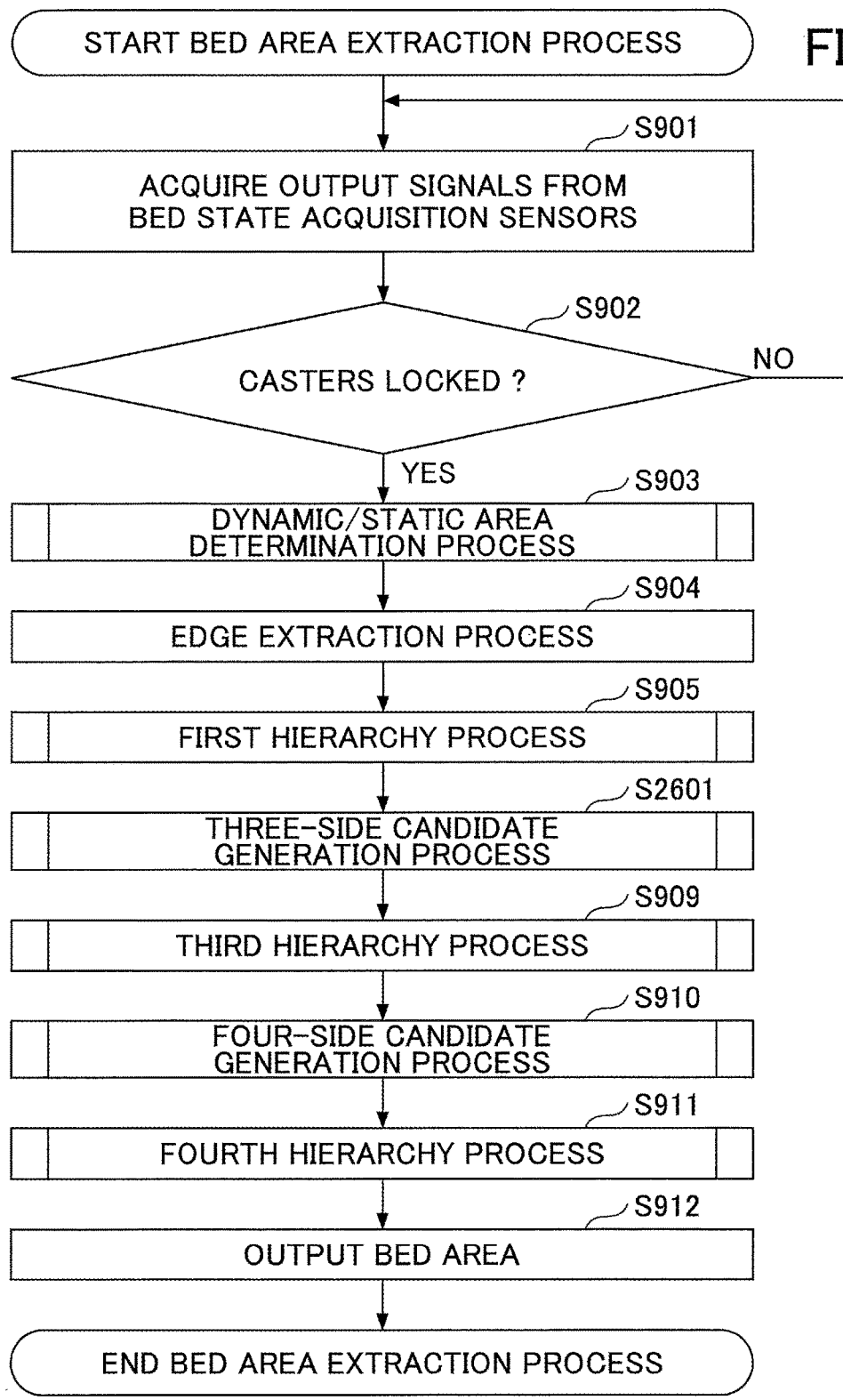
FIG. 26 is a second flowchart of another example of the bed area extraction process.

Next, the bed area extraction process according to the second embodiment is described. FIG. 26 is a flowchart of an example of the bed area extraction process according to the second embodiment. Here, the same reference numerals are used to describe the same steps as those in the process described with reference to FIG. 9, and the repeated descriptions thereof are herein omitted.

The flowchart of FIG. 26 difference from that of FIG. 9 in the generation process of generating the "three-side candidate" in step S2601. That is, when the "one-side candidates" are extracted by performing the first hierarchy process by the first hierarchy processor 830, in step S2601, the three-side combiner 860 takes three "one-side candidates" one after another from among the extracted "one-side candidates", and generates the "three-side candidate" under a predetermined condition. Further, the first hierarchy processor 830 records the generated "three-side candidate" in the bed area candidate information 700. By doing this, the third hierarchy processor 870 can perform the third hierarchy process (in step S909) by using the "three-side candidates" recording in the bed area candidate information 700.

As described, the bed area extraction process according to the second embodiment includes the first hierarchy process (step S905), the third hierarchy process (step S909), and the fourth hierarchy process (step S911), and includes at least the following processes.

A process of extracting still (not moving) edges as the "one-side candidates" from plural captured images; and A process of selecting the "three-side candidates" based on the angle between the "both-end two sides" (edges which cross to each other) of the "three-side candidate" generated as the combinations of (three) "one-side candidates" and the width between the "both-end two sides".

Figure 27:
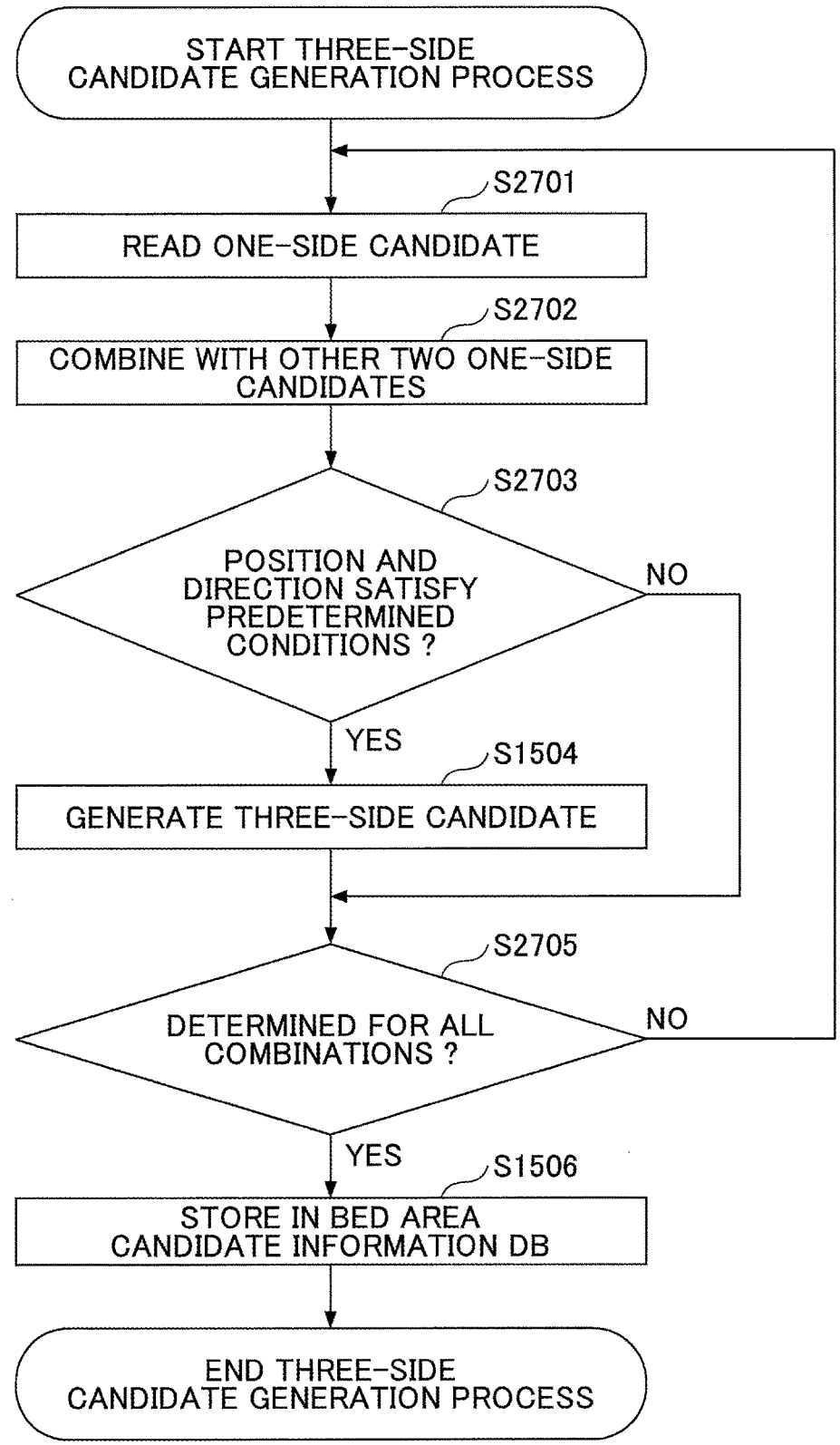
FIG. 27 is a second flowchart of another example of the generation process of generating the three-side candidate.

Next, details of the generation process of generating the "three-side candidate" (in step S2601) are described. FIG. 27 is a flowchart of an example of the generation process of generating the "three-side candidate".

In step S2701, the three-side combiner 860 reads the "one-side candidate" one after another recording in the bed area candidate information 700. In step S2702, the three-side combiner 860 generates the "three-side candidate" by combining the read "one-side candidate" with other two "one-side candidates".

In step S2703, the three-side combiner 860 determines whether the position and the direction of the three "one-side candidates" combined in step S2702 satisfy predetermined conditions. Here, the predetermined conditions herein refer to, for example, the followings:

Among three "one-side candidates", a distance between the coordinates of one end of a first "one-side candidate" and the coordinates of one end of a second "one-side candidate" is less than or equal to a predetermined distance;

A distance between the coordinates of the other end of the second "one-side candidate" and the coordinates of one end of a third "one-side candidate" is less than or equal to a predetermined distance; and The first "one-side candidate" and the third "one-side candidate" are located on the same side of the second "one-side candidate".

When it is determined that the predetermined conditions are not satisfied (NO in step S2703), the process goes to step S2705 directly. On the other hand, when it is determined that the predetermined conditions are satisfied (YES in step S2703), the process goes to step S1504.

In step S1504, when determining that the predetermined conditions are satisfied, the three-side combiner 860 combines those three "one-side candidates" to generate the "three-side candidate", and the process goes to step S2705.

In step S2705, the three-side combiner 860 determines whether the determination is performed on all combinations which can generate the "three-side candidates" based on respective three "one-side candidates" recorded in the bed area candidate information 700.

When it is determined that there exists a "three-side candidate" on which the determination is not performed (NO in step S2705), the process goes back to step S2701. On the other hand, when it is determined that the determination is performed on all combinations (YES in step S2705), the process goes to step S1506. In step S1506, the three-side combiner 860 records the "three-side candidates", which are generated by combining three "one-side candidates" which are determined to satisfy the predetermined conditions, in the third hierarchy of the bed area candidate information 700.

As is obvious from the above description, the bed area extraction apparatus 310 according to the second embodiment divides the process of extracting the bed area based on the edges extracted from the captured image into three hierarchies, and selects the candidates based on the conditions in each hierarchy. By doing this, it becomes possible to accurately and effectively identify the bed area.

Third Embodiment

In above first and second embodiments, the "four-side candidate" is generated by combining the "three-side candidates" extracted by performing the third hierarchy process. On the other hand, in the third embodiment, the "four-side candidate" is generated by estimating the fourth side from a "three-side candidate" by using a known shape (aspect ratio) of the bed 110. In the following, details of the third embodiment are described.

Figure 28:
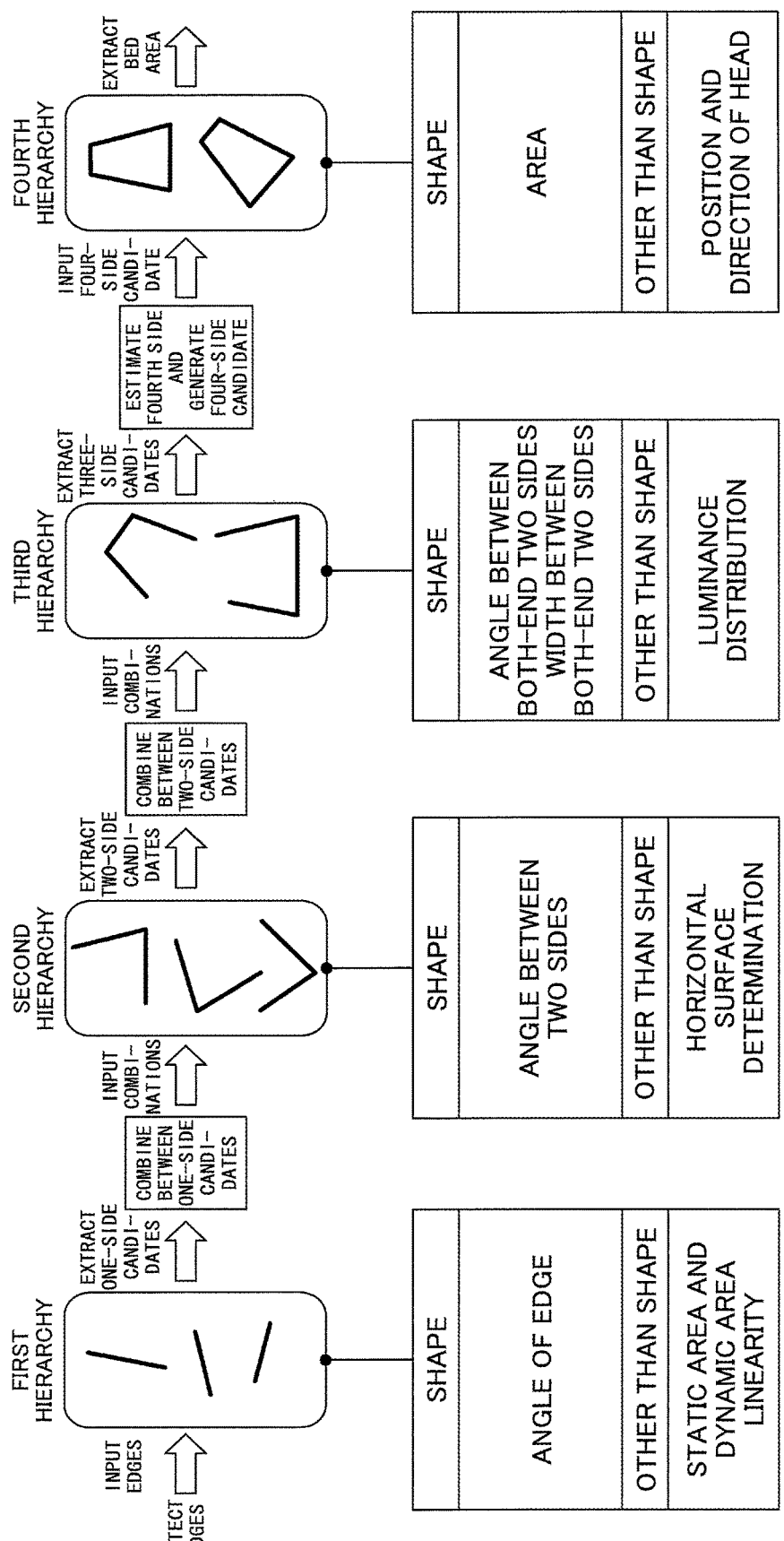
FIG. 28 is a third drawing illustrating still another fundamental principle of the bed area extraction process.

First, a fundamental principle of the bed area extraction process according to the third embodiment is described. FIG. 28 illustrates an example of the fundamental principle of the bed area extraction process according to the third embodiment. The first hierarchy through the third hierarchy of FIG. 28 are the same as the first hierarchy through the third hierarchy as described with reference to FIG. 5.

In the third embodiment, when the "three-side candidates" are extracted in the third hierarchy, the "four-side candidate" is generated by estimating the fourth side for each of the "three-side candidates". In estimating the fourth side, a known shape (aspect ratio) of the bed 110 is used. Specifically, by assuming that the width of the "both-end two sides" of the "three-side candidate" corresponds to the width of the bed 110, the position and the length of the fourth side relative to the "three-side candidate" are estimated based on the known shape (aspect ratio) of the bed 110. The four-side combiner 880 combines the estimated fourth side with the "three-side candidate" to generate the "four-side candidate", and records the generated "four-side candidate" in the "fourth hierarchy" of the bed area candidate information 700.

As described, in the bed area extraction apparatus 310 according to the third embodiment, it becomes possible to skip the process of combining the "three-side candidate" with each other, so that it become possible to generate the "four-side candidate" with an easier process.

Figure 29:
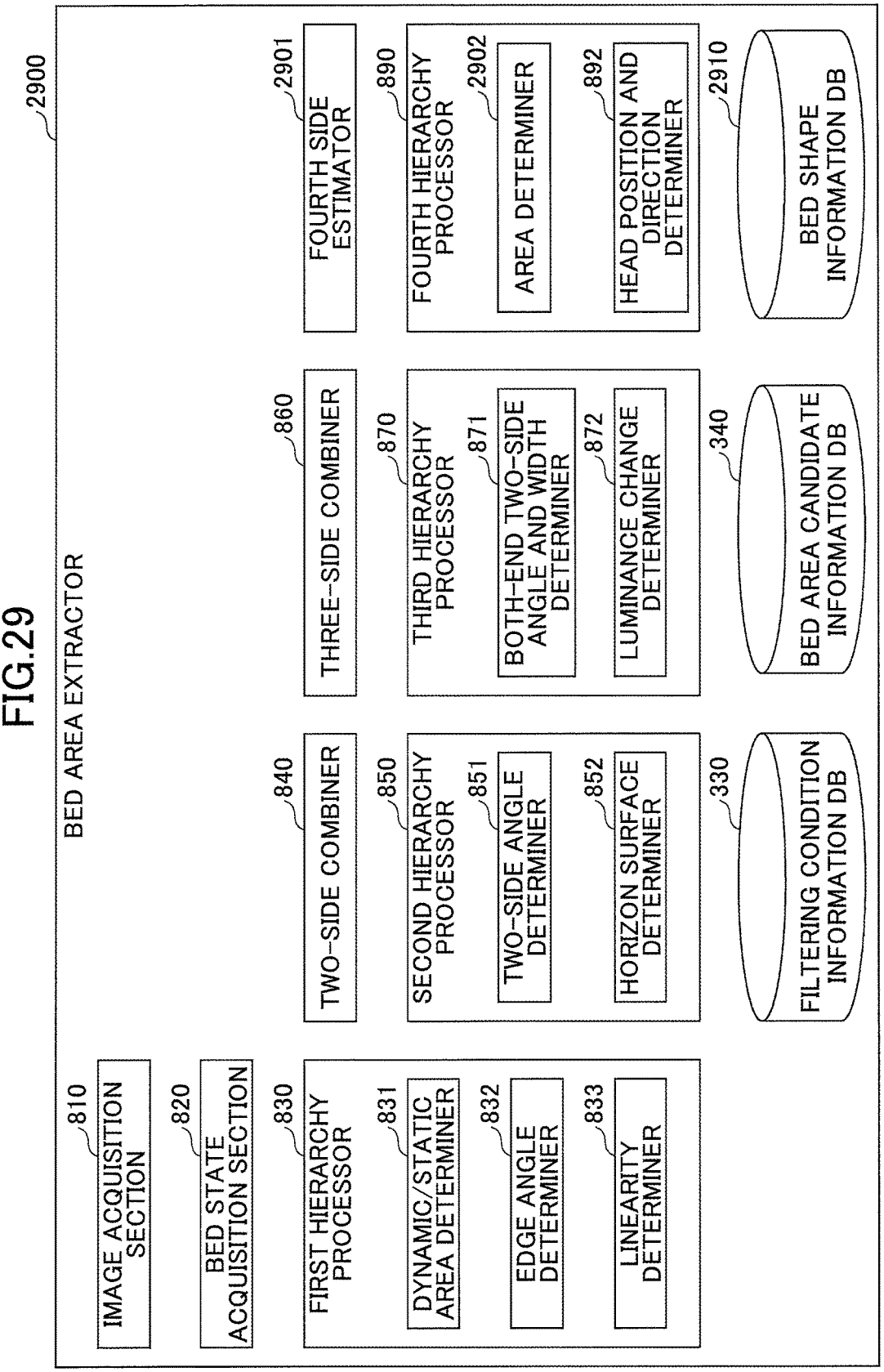
FIG. 29 is a second drawing illustrating another example functional configuration of the bed area extractor.

Next, an example functional configuration of a bed area extractor 2900 according to the third embodiment is described. FIG. 29 illustrates an example functional configuration of a bed area extractor 2900 according to the third embodiment. In FIG. 29, the same reference numerals are used to describe the same elements as described with reference to FIG. 8, and the repeated descriptions thereof are herein omitted.

The functional configuration of a bed area extractor 2900 in FIG. 29 differs from the functional configuration of FIG. 8 in a fourth side estimator 2901, an area determiner 2902, and a bed shape information DB 2910. The fourth side estimator 2901 estimates the position and the length of the fourth side based on the "three-side candidate" which is extracted by the third hierarchy processor 870. Specifically, the fourth side estimator 2901 estimates the position and the length of the fourth side based on the width of the "both-end two sides" of the "three-side candidate" and the aspect ratio of the bed 110 stored in the bed shape information DB 2910. Further, the fourth side estimator 2901 generates the "four-side candidate" based on the estimated fourth side and the "three-side candidate", and records the generated "four-side candidate" in the bed area candidate information 700.

The area determiner 2902 excludes the "four-side candidate(s)" whose area is not within the predetermined range (greater than or equal to "$S_1$" and less than "$S_2$") from the "four-side candidates" recorded in the bed area candidate information 700. Note that, in the third embodiment, the aspect ratios of the "four-side candidates" recorded in the bed area candidate information 700 corresponds to the aspect ratio of the bed 110. Therefore, the determination of the aspect ratio is not performed.

The bed shape information DB 2910 manages the information related to the bed shapes of the plural beds used in the facility (e.g., a hospital, a care facility, etc.) where the bed area extraction system 300 is installed. The information related to the bed shapes includes the aspect ratios of the beds.

FIG. 30 illustrates an example of the bed shape information 3000. The bed area extraction system 300 is generated on a facility basis where the bed area extraction system 300 is installed, and is stored in the bed shape information DB 2910.

FIG. 30 illustrates the bed shape information 3000 of a hospital "A", which includes the information items a "hospital ward", a "room No.", a "bed ID", and the "aspect ratio".

In the "hospital ward", the hospital ward names of the hospital "A" are recorded. In the "room No.", the room Nos. of each hospital ward are recorded. In the "bed ID", the bed IDs to identify the beds installed in each room are recorded. In the "aspect ratio", a ratio between the vertical length and the horizontal length of the beds which are identified by the bed IDs is recorded.

The example of FIG. 30 indicates that the "aspect ratio" of the beds in the room whose "room No." is 101 in the Hospital ward "α" of the hospital "A" is "H1:W1", and the "aspect ratio" of the beds in the room whose "room No." is 101 is "H2:W2".

Figure 31:
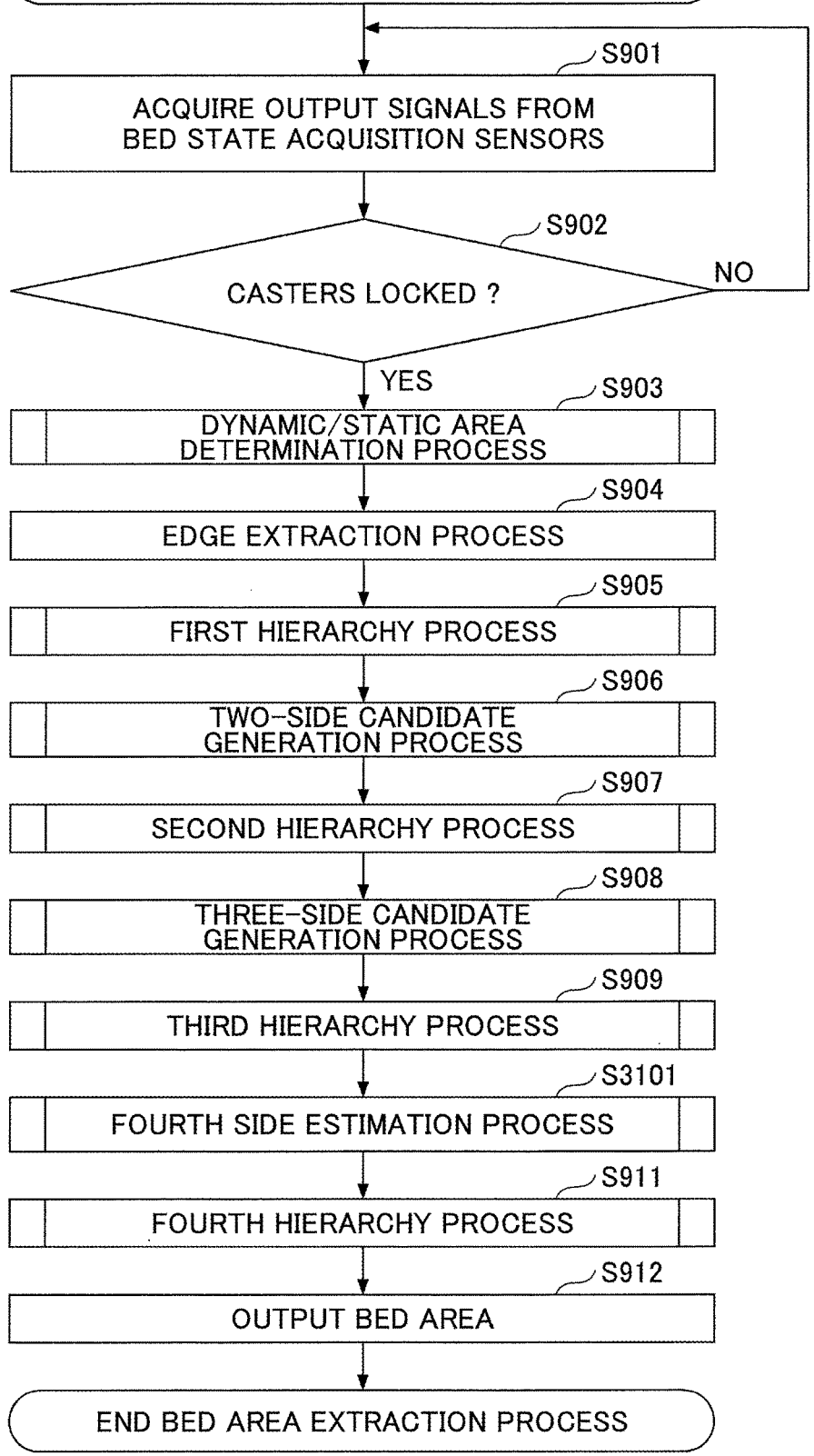
FIG. 31 is a third flowchart of still another example of the bed area extraction process.

Next, the bed area extraction process according to the third embodiment is described. FIG. 31 is a flowchart of an example of the bed area extraction process according to the third embodiment. In FIG. 31, the same reference numerals are used to describe the same steps of those in the bed area extraction process described with reference to FIG. 9, and the repeated descriptions thereof are herein omitted.

The flowchart of FIG. 31 differs from the flowchart of FIG. 9 in that when the "three-side candidate" is extracted by performing the third hierarchy process by the third hierarchy processor 870, in step S3101, the fourth side estimator 2901 estimates the position and the length of the fourth side based on the bed shape information 3000. Further, the fourth side estimator 2901 generates the "four-side candidate" by combining the estimated fourth side with the "three-side candidate", and records the generated "four-side candidate" in the "fourth hierarchy" of the bed area candidate information 700. Based on this, the fourth hierarchy processor 890 can use the generated "four-side candidate" to perform the fourth hierarchy process (in step S911).

Figure 32:
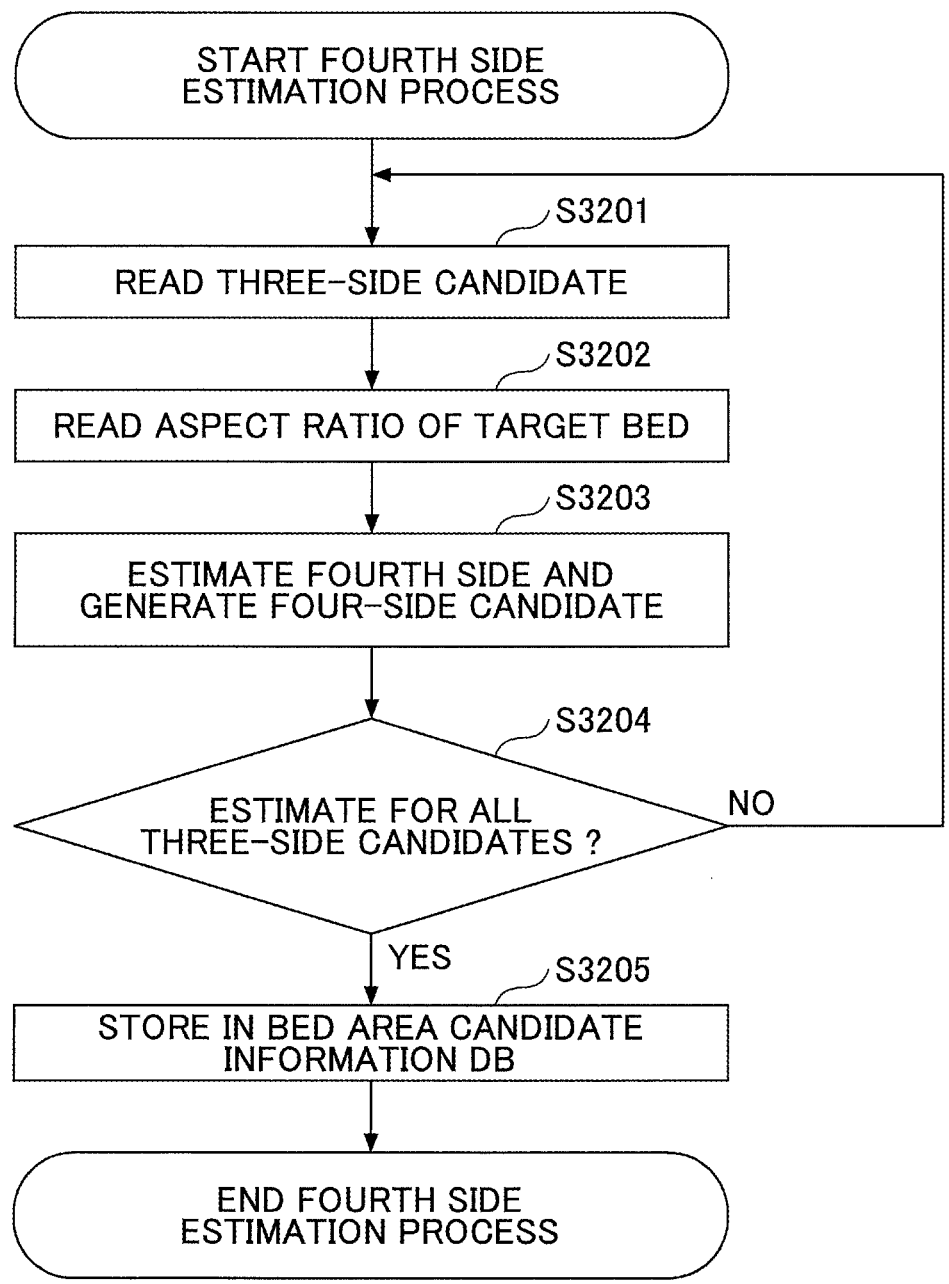
FIG. 32 is a flowchart of an estimation process of estimating the four-side candidate.

Next, details of the fourth side estimation process of estimating the fourth side are described. FIG. 32 is a flowchart of an example of the fourth side estimation process.

In step S3201, the fourth side estimator 2901 reads the "three-side candidate" one after another recorded in the bed area candidate information 700. In step S3202, the fourth side estimator 2901 reads the information related to the aspect ratio of the bed 110 from the bed shape information 3000.

In step S3203, the fourth side estimator 2901 estimates the fourth side relative to the read "three-side candidate" based on the "three-side candidate" which is read in step S3201 and the information related to the aspect ratio which is read in step S3202.

Specifically, based on the width of the "both-end two sides" of the read "three-side candidate" and the read aspect ratio, the fourth side estimator 2901 calculates the length in the vertical direction of the "four-side candidate" to be generated. Further, the fourth side estimator 2901 calculates the position and the length of the fourth side which is identified based on the calculated length. Further, the fourth side estimator 2901 combines the fourth side having the calculated positions and the length with the "three-side candidate" to generate the "fourth-side candidate".

In step S3204, the fourth side estimator 2901 determines whether the process of estimating the fourth side and generating the "four-side candidate" is performed on all "three-side candidates" recorded in the bed area candidate information 700. When it is determined that there exists a "three-side candidate" on which the process of estimating the fourth side is not performed (NO in step S3204), the process goes back to step S3201 to read the next "three-side candidate".

On the other hand, when it is determined that the process of estimating the fourth side is performed on all "three-side candidates" (YES in step S3204), the process goes to step S3205. In step S3205, the fourth side estimator 2901 records the generated "four-side candidate" generated in step S3203 in the "fourth hierarchy" of the bed area candidate information 700.

As is obvious from the above description, the bed area extraction apparatus 310 according to the third embodiment divides the process of extracting the bed area based on the edges detected from the captured image into four hierarchies, and selects the candidates in accordance with the conditions of each hierarchy. Further, when generating the "four-side candidate" from the "three-side candidate" selected in the third hierarchy, the bed area extraction apparatus 310 estimates the fourth side based on a known bed shape. By doing this, it becomes possible to accurately and effectively identify the bed area.

Fourth Embodiment

In the above third embodiment, the bed area extraction process is divided into four hierarchies, and in the third hierarchy, a known bed shape is used to estimate the fourth side. On the other hand, according to the fourth embodiment, after the bed area extraction process is divided into three hierarchies, when generating the "four-side candidate" based on the "three-side candidate" selected in the third hierarchy, the fourth side is estimated by using a known bed shape. In the following, the fourth embodiment is described.

Figure 33:
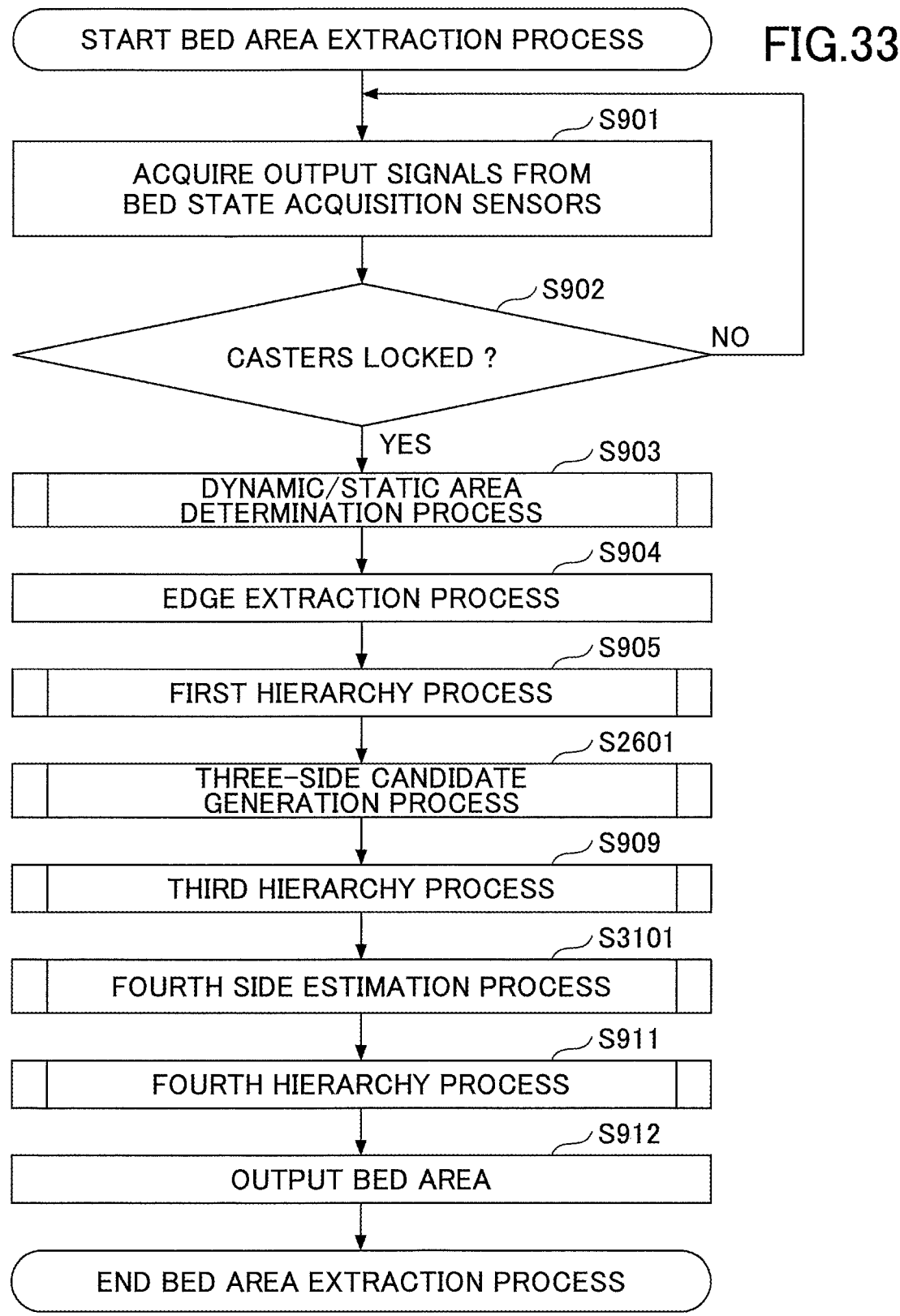
FIG. 33 is a fourth flowchart of still another example of the bed area extraction process.

FIG. 33 is a flowchart of an example of the bed area extraction process according to the fourth embodiment. Here, the same reference numerals are used to describe the same steps as the steps of the bed area extraction process described with reference to FIG. 26, and the repeated descriptions thereof are herein omitted.

The flowchart of FIG. 32 differs from the flowchart of FIG. 26 in a fourth side estimation process in step S3101. When the "three-side candidate" is extracted by performing the third hierarchy process by the third hierarchy processor 870, in step S3101, the fourth side estimator 2901 estimates the position and the length of the four side based on the bed shape information 3000. Further, the fourth side estimator 2901 combines the estimated fourth side with the "three-side candidate" to generate the "four-side candidate", and records the generated "four-side candidate" in the "fourth hierarchy" of the bed area candidate information 700. By doing this, it becomes possible for the fourth hierarchy processor 890 to perform the fourth hierarchy process (in step S911) by using the "four-side candidate" recording in the bed area candidate information 700.

As is obvious from the above description, the bed area extraction apparatus 310 according to the fourth embodiment divides the process of extracting the bed area based on the edges detected from the captured image into three hierarchies, and selects the candidates in accordance with the conditions in each hierarchy. Further, when generating the "four-side candidate" based in the "three-side candidate" selected in the third hierarchy, the fourth side is estimated by using a known bed shape. By doing this, it becomes possible to accurately and effectively identify the bed area.

Fifth Embodiment

In above first through fourth embodiments, it is assumed that the bed area extraction process is performed one time based on the nth frame of the captured image which is imaged when it is determined that the bed 110 is in the fixed state. However, the number of times when the bed area extraction process is performed is not limited to one. For example, while the bed 110 is in the fixed state, the bed area extraction process may be performed on the frame basis (every frame). Otherwise, for example, the bed area extraction process may be performed on the frame basis, and the bed area extraction process terminates when the "four-side candidate", which is output as the bed area 140, has converged.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the spirit and scope of the invention.

What is claimed is:

1. A method of extracting a bed area of a bed performed by a computer, the method comprising:
   detecting linear edges which remain stationary among plural images; and
   selecting a bed area candidate based on lengths of the linear edges and angles between the linear edges which cross to each other in a boxed U shape formed as combinations of the detected linear edges,
   wherein the selecting includes:
   selecting the bed area candidate based on uniformity of luminance and an area of a region surrounded by a candidate region which is identified with openings of two boxed U shapes facing each other; and
   selecting the bed area candidate based on a direction and a position of a face included in the images and a position and an aspect ratio of the candidate region identified with the openings of the two boxed U shapes facing each other.

2. The method according to claim 1,
   wherein the angles between and the lengths of the linear edges detected from the plural images satisfy respective predetermined conditions.

3. The method according to claim 1,
   wherein the selecting includes selecting the bed area candidate based on an L shape formed as a combination of the detected linear edges.

4. The method according to claim 3,
   wherein the selecting includes selecting the bed area candidate based on a comparison between horizontal components of the linear edges included in the L shape.

5. The method according to claim 1,
   wherein the candidate region is identified when two sides at a respective one of both ends of one of the two boxed U shapes and the two sides at a respective one of both ends of the other of the two boxed U shapes are placed on respective same lines.

6. The method according to claim 5,
   wherein the candidate region is identified when, in the candidate region, a width between the two sides of one of the two boxed U shapes located on a lower side is greater than a width between the two sides of the other of the two boxed U shapes located on an upper side.

7. The method according to claim 1,
   wherein the selecting includes selecting the bed area candidate based on uniformity of luminance and an area of a region surrounded by a candidate region which is identified based on the boxed U shape and an aspect ratio of the bed.

8. A bed area extraction apparatus comprising:
   a memory device configured to store plural images; and
   a processor configured to execute a bed area extraction process,
   wherein the bed area extraction process includes:
   detecting linear edges which remain stationary among the images stored in the memory device, and
   selecting a bed area candidate based on lengths of the linear edges and angles between the linear edges which cross each other in a boxed U shape formed as combinations of the detected linear edges,
   wherein the selecting includes:
   selecting the bed area candidate based on uniformity of luminance and an area of a region surrounded by a candidate region which is identified with openings of two boxed U shapes facing each other; and
   selecting the bed area candidate based on a direction and a position of a face included in the images and a position and an aspect ratio of the candidate region identified with the openings of the two boxed U shapes facing each other.

9. A non-transitory computer-readable recording medium having stored therein a program for causing a computer to execute a bed area extraction process comprising:
   detecting linear edges which remains stationary among plural images; and
   selecting a bed area candidate based on lengths of the linear edges and angles between the linear edges which cross to each other in a boxed U shape formed as combinations of the detected linear edges,
   wherein the selecting includes:
   selecting the bed area candidate based on uniformity of luminance and an area of a region surrounded by a candidate region which is identified with openings of two boxed U shapes facing each other; and
   selecting the bed area candidate based on a direction and a position of a face included in the images and a position and an aspect ratio of the candidate region identified with the openings of the two boxed U shapes facing each other.

\* \* \* \* \*